(12) United States Patent
Katamoto et al.

(10) Patent No.: US 6,188,419 B1
(45) Date of Patent: Feb. 13, 2001

(54) COLOR IMAGE-FORMING DEVICE

(75) Inventors: Koji Katamoto; Osamu Fujimoto; Ayumu Oda, all of Yamatokoriyama; Syoichiro Yoshiura, Tenri; Yoichi Shimazawa, Nara, all of (JP)

(73) Assignee: Sharp Kabushiki Kaisha, Osaka (JP)

( * ) Notice: Under 35 U.S.C. 154(b), the term of this patent shall be extended for 0 days.

(21) Appl. No.: 09/135,473

(22) Filed: Aug. 17, 1998

(30) Foreign Application Priority Data

Aug. 18, 1997 (JP) .................................................. 9-221821

(51) Int. Cl.[7] .......................... B41J 2/385; G03G 13/04; G03G 15/00
(52) U.S. Cl. .......................... 347/129; 347/115; 347/232; 399/38
(58) Field of Search ...................... 347/115, 116, 347/117, 118, 129, 132, 232, 233, 237, 247; 399/38, 51, 85

(56) References Cited

U.S. PATENT DOCUMENTS

| | | | |
|---|---|---|---|
| 4,578,689 | * 3/1986 | Spencer et al. ....................... | 347/129 |
| 4,965,749 | 10/1990 | Straayer ............................... | 364/520 |
| 5,208,608 | 5/1993 | Okuyama et al. .................... | 346/108 |
| 5,436,647 | 7/1995 | Kasahara ............................. | 347/115 |

FOREIGN PATENT DOCUMENTS

| | | |
|---|---|---|
| 0 356 238 | 2/1990 | (EP) . |
| 2 267 195 | 11/1993 | (GB) . |
| 4-247418 | 9/1992 | (JP) . |

* cited by examiner

*Primary Examiner*—Sandra Brase
(74) *Attorney, Agent, or Firm*—Dike, Bronstein, Roberts & Cushman, LLP; David G. Conlin

(57) ABSTRACT

In conventional color digital copy machines, when copying in color mode, the polygon mirror of the laser beam scanner for black, which is driven at a higher speed than those of the other colors, is switched to a slower speed in conformity with the speed of the polygon mirrors for the other colors. However, a drawback of this structure is that, especially when switching from monochrome to color mode, the time required to obtain the first copy is lengthened, and the operating efficiency of copying is poor. In the present invention, when copying in color mode, the rotation speed of the polygon mirror of the laser scanner unit for black is not changed at all, but, by skipping certain mirror surfaces of the polygon mirror, and/or by skipping certain of a plurality of laser light sources, the scanning density of the laser scanner unit for black can be brought into conformity with that of the laser scanner units for the other colors.

29 Claims, 20 Drawing Sheets

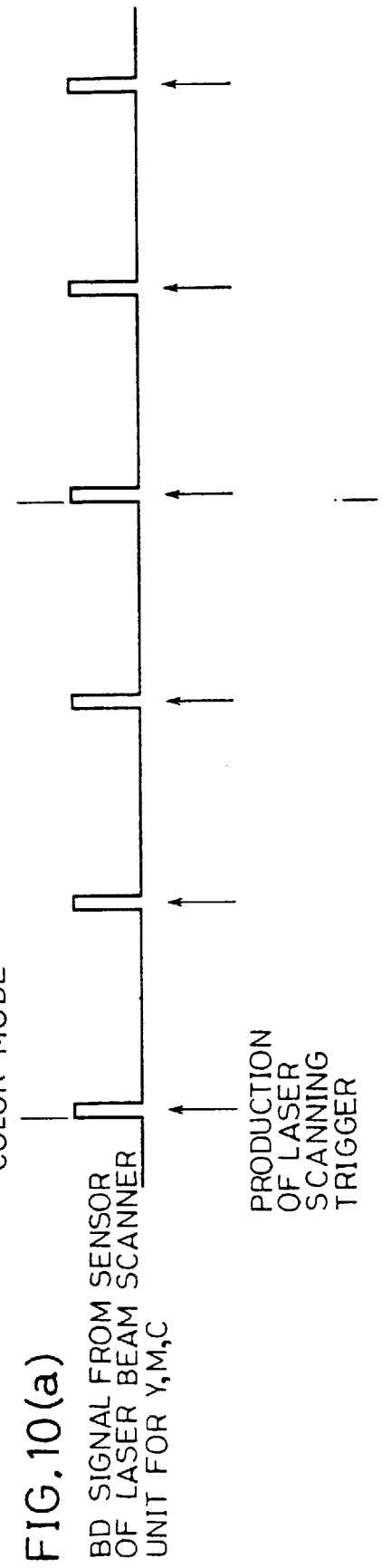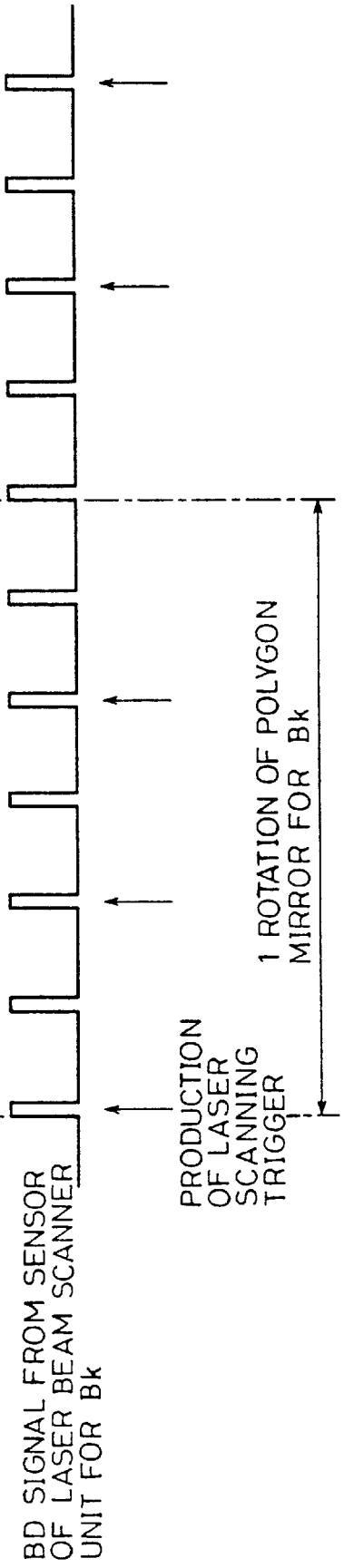

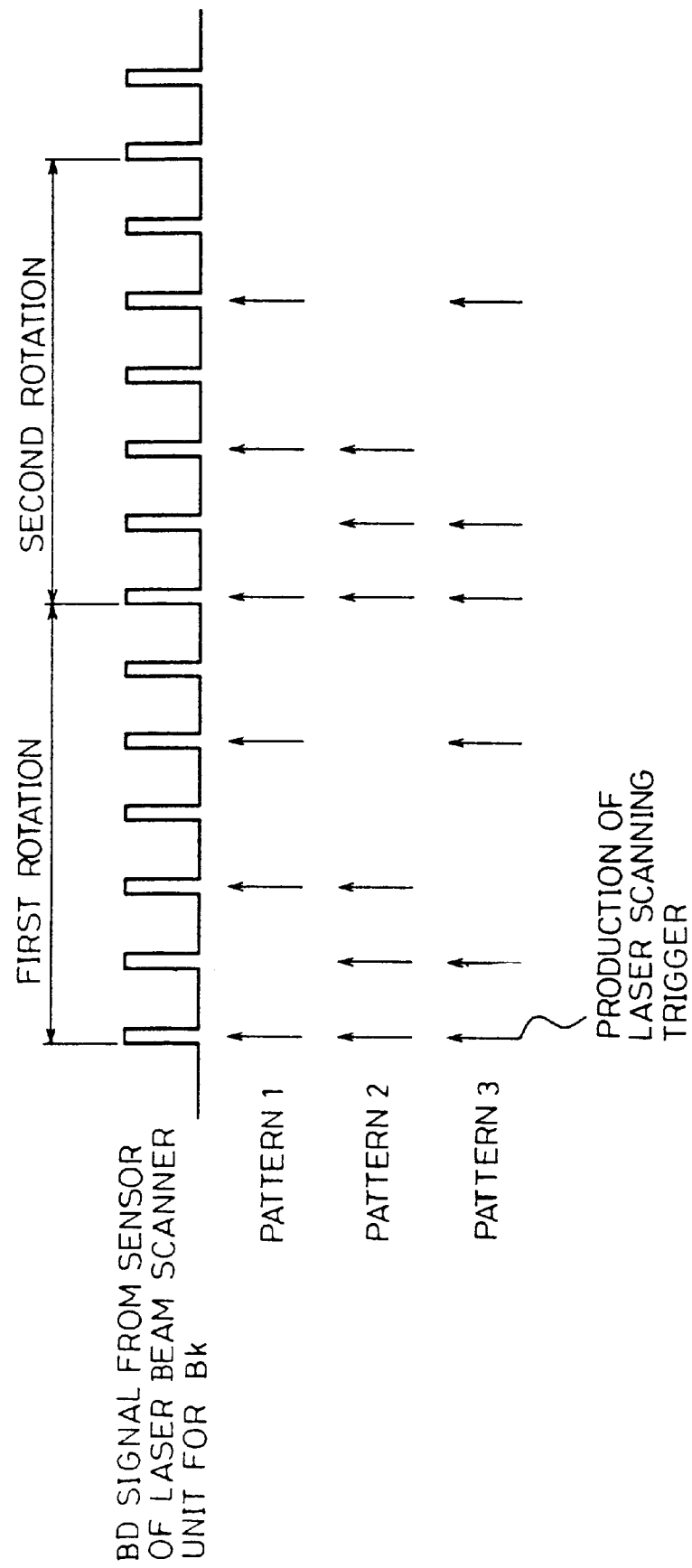

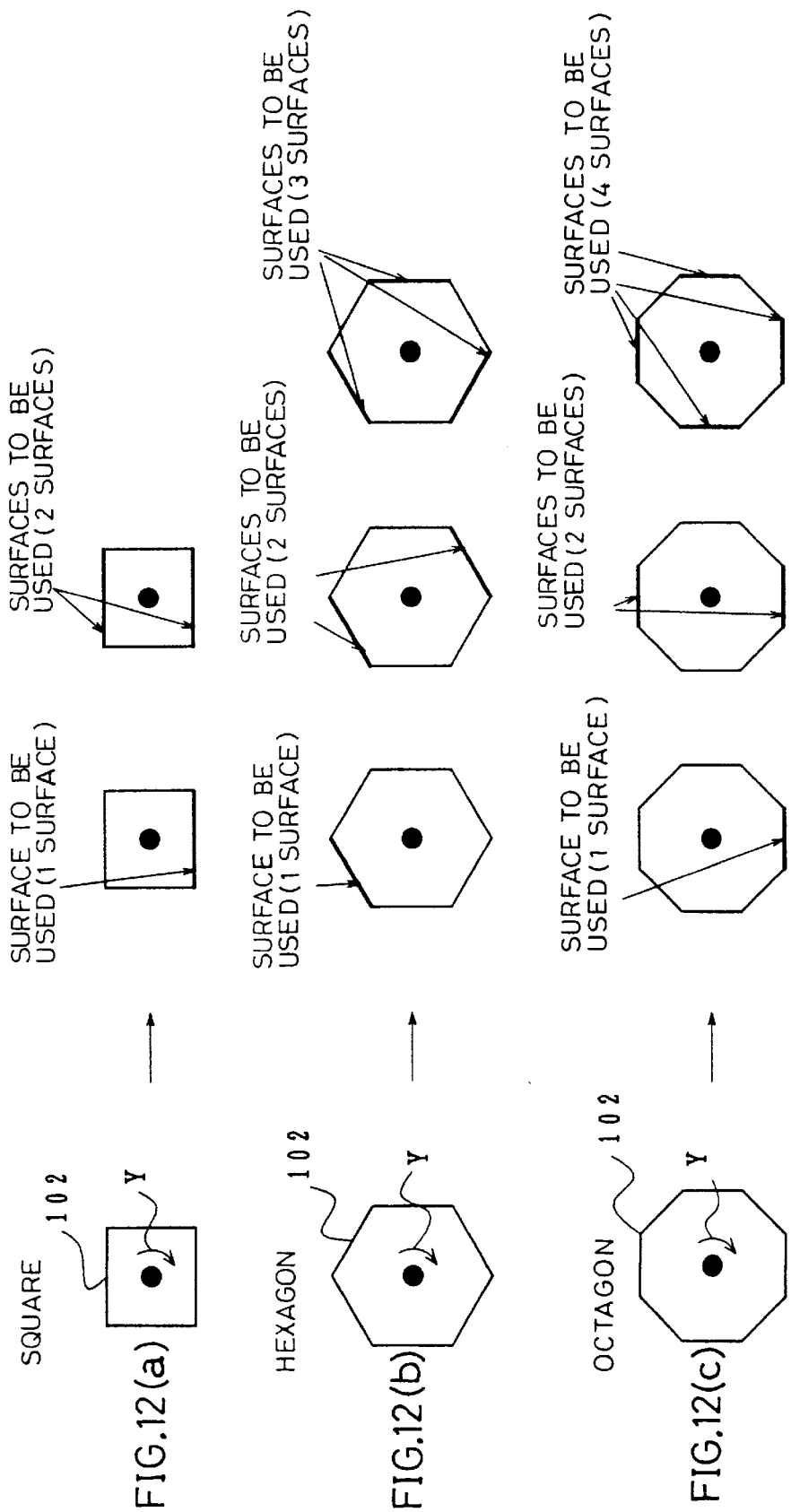

COLOR IMAGE-FORMING DEVICE

FIELD OF THE INVENTION

The present invention relates to a color image-forming device, such as a color digital copy machine, which, based on color digital image signals, forms color images using a plurality of laser recording sections.

BACKGROUND OF THE INVENTION

In color image-forming devices such as color digital copy machines, generally, an image of a color original, inputted through a scanner, undergoes predetermined image processing to color separate and color convert the image into image data for each color, and a color printer section, which reproduces the image by image data for each color, outputs an image of the color original.

In addition, recently color digital copy machines have appeared on the market which, for high-speed reproduction of high-resolution color originals, include an image-forming device which uses laser recording scanning. In color digital copy machines of this type, by means of a laser deflection scanning section provided in each laser recording section, laser light modulated in accordance with digital image signals is guided to and performs scanning of a photoreceptor. The chief members of this laser deflection scanning unit are a rotating polygon mirror (hereinafter referred to as the "polygon mirror") and a motor which rotates the polygon mirror at high speed.

Further, recently color digital copy machines have appeared on the market which, in order to improve repeatability of black and of the color image as a whole, are typically provided with a Bk (black) recording section in addition to Y (yellow), M (magenta), and C (cyan) recording sections. For this reason, a monochrome mode is provided in addition to color mode, and thus both color and monochrome copying are possible.

In this kind of color digital copy machine, monochrome copying is set to be performed faster than color copying. This is because, in the case of, for example, the multiple revolution process method, which uses a single photoreceptor, color copying is a four-color process and monochrome copying a one-color process, and thus monochrome copying is necessarily faster. It is also due to the much greater frequency of monochrome over color copying.

In the tandem method, which uses a plurality of photoreceptors, unlike the multiple revolution process method, color and monochrome copying are performed at the same speed, but in order to respond to the demand for faster monochrome than color copying, process speeds such as surface speed of the photoreceptor, transport speed of the recording paper, etc., and the operating speed of the laser recording section which includes the laser scanning unit for black, are set faster than in the color mode.

In this case, the rotation speed of the motor which rotates the polygon mirror of the laser scanning unit of the laser recording section for black is switched between two speeds, one for monochrome mode and one for color mode. Further, if, during waiting, the motor is rotated at a waiting speed slower than that during color mode copying, the motor must be controlled by switching among three speeds.

In contrast, Japanese Unexamined Patent Publication No. 4-247418/1992 (Tokukaihei 4-247418) discloses a structure, in a monochrome laser printer, for reducing scanning density by skipping certain surfaces of the polygon mirror.

However, with the foregoing color digital copy machines structured so as to switch the speed of the motor of the laser recording section, a problem arises due to switching the speed of the motor which rotates the polygon mirror. When switching between monochrome and color modes (especially from monochrome to color), it takes a long time to obtain the first copy.

In other words, in switching the motor speed of the laser recording section for black, when monochrome mode is switched to color mode, it is necessary to bring the motor speed of the laser recording section for black into conformity with the motor speed of the laser recording sections for color, and to synchronize their mirror surfaces, but it takes a long time to attain this synchronization.

This is because it is difficult to stabilize the motor speed of the polygon mirror when its speed is reduced from the high-speed monochrome mode to the low-speed color mode, and this stabilization requires a great amount of time. As a result, the start of copying immediately after switching the copy mode is delayed, and the time required to obtain the first copy is lengthened. Incidentally, with conventional technology, motor speed stabilizes relatively quickly when motor speed is increased.

SUMMARY OF THE INVENTION

It is an object of the present invention to provide, in a color digital copy machine having a monochrome mode and a color mode, a color image-forming device able to improve the efficiency of copying operations by making switching between the two modes smoother.

In order to attain the foregoing object, an image-forming device according to the present invention includes an image-forming section, provided with a recording section for color image formation and a recording section for monochrome image formation, each of which performs optical scanning of a photoreceptor by using a rotating polygon having a reflective mirror on at least one surface thereof to guide to the photoreceptor light modulated in accordance with image information; the image-forming section forming an image based on image information formed on the photoreceptor; and process speed switching means, which switch process speed of the image-forming section such that process speed during forming of monochrome images is faster than during forming of color images; in which the recording section for monochrome image formation is provided with a first scanning mode, which corresponds to a high process speed, and a second scanning mode, which corresponds to a low process speed, and which performs scanning with a scanning density equivalent to that of the recording section for color image formation, without changing rotation speed of the rotating polygon having a reflective mirror on at least one surface thereof. In this structure, during forming of color images (in color mode), the process speed switching means switch to a process speed slower than that during forming of monochrome images (in monochrome mode), and the laser recording section for monochrome image formation uses the second scanning mode, which performs laser scanning with a scanning density equivalent to that of the recording section for color image formation, without changing the rotation speed of the rotating polygon having a reflective mirror on at least one surface thereof. Thus it is possible to switch instantaneously from monochrome to color mode. Further, in monochrome mode, the process speed switching means switch to the faster process speed, and the laser recording section for monochrome image formation uses the first scanning mode corresponding to a high process speed, without changing the rotation speed of the rotating polygon. Thus it is possible to switch instantaneously from color to monochrome mode.

Accordingly, when switching between monochrome and color mode, and in particular when switching from monochrome mode to color mode, the time required to obtain the first copy can be shortened, and the efficiency of copying operations can be improved.

Additional objects, features, and strengths of the present invention will be made clear by the description below. Further, the advantages of the present invention will be evident from the following explanation in reference to the drawings.

BRIEF DESCRIPTION OF THE DRAWINGS

FIGS. 10(a) and 10(b) are explanatory drawings showing BD signals and timings for producing laser scanning triggers in a color mode (second scanning mode) of the foregoing color digital copy machine.

FIG. 11 is an explanatory drawing showing a BD signal and another timing for producing laser scanning triggers in the color mode (second scanning mode) of the foregoing color digital copy machine.

FIGS. 12(a) through 12(c) are explanatory drawings showing specific examples of shapes for a polygon mirror of the laser beam scanner unit for black provided in the foregoing color digital copy machine, and showing surfaces to be used of the polygon mirror of each shape.

DESCRIPTION OF THE EMBODIMENTS

First Embodiment

The following will explain one embodiment of the present invention with reference to the Figures.

Figure 2:
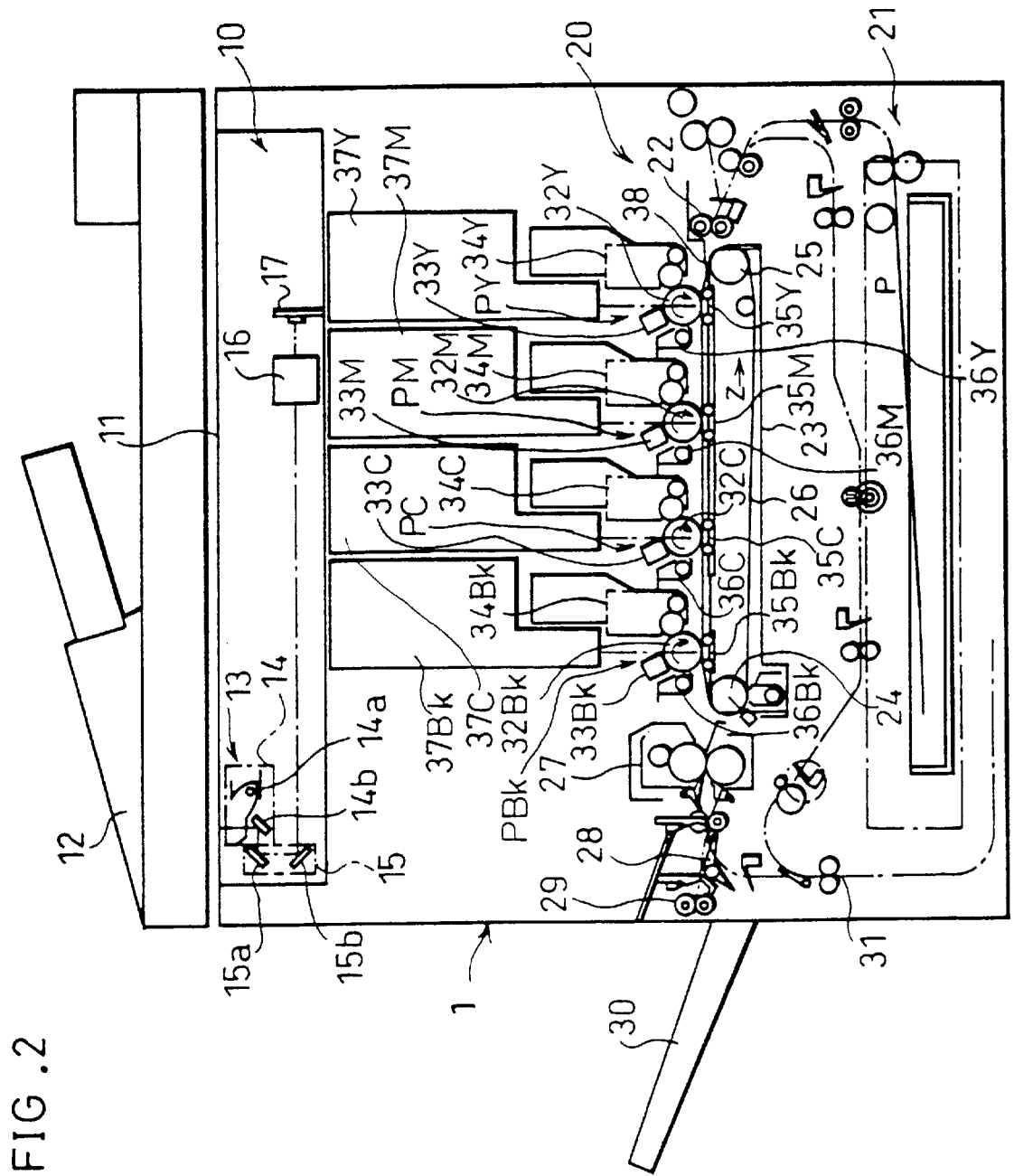
FIG. 2 is an overall structural drawing of the foregoing color digital copy machine.

As shown in FIG. 2, the color image-forming device according to the present embodiment is a color digital copy machine which includes a copy machine main body 1, on the upper surface of which are provided an original plate 11 and an operating panel 60 (see FIG. 5) to be discussed below, and inside of which are provided an image-reading section 10 and an image-forming section 20.

On the upper surface of the original plate 11 is installed an automatic original feeding device 12, which is supported so that it can be opened and closed with respect to the original plate 11, and which has a predetermined positional relation with the upper surface thereof.

The automatic original feeding device 12 is a recirculating automatic document feeder (RADF) able to handle double-sided originals, and transports an original so that one side thereof is placed opposite the image-reading section 10 at a predetermined location of the original plate 11, and, after the image-reading section 10 completes reading of an image from that side of the original, turns over and transports the original so that the other side thereof is placed opposite the image-reading section 10 at a predetermined location of the original plate 11. Then, after completion of reading of images from both sides of an original, the original is discharged, and operations for transporting and turning over another original are executed. The foregoing operations for transporting and turning over originals are controlled in relation with the operations of the color digital copy machine as a whole.

The image-reading section 10 is provided below the original plate 11, so that it may read an image of an original transported to the original plate 11 by the automatic original feeding device 12, and includes an original scanning body 13, which moves back and forth in parallel motion along the lower surface of the original plate 11; an optical lens 16; and a CCD line sensor 17.

The original scanning body 13 is made up of a first scanning unit 14 and a second scanning unit 15. The first scanning unit 14, which includes an exposing lamp 14a which exposes the image side of an original, and a first mirror 14b which deflects in a predetermined direction a reflected optical image from the original, moves back and forth in parallel motion at a predetermined scanning speed, maintaining a predetermined distance from the lower surface of the original plate 11. The second scanning unit 15, which includes second and third mirrors 15a and 15b, each of which deflects in a predetermined direction the reflected optical image of the original deflected by the first mirror 14b of the first scanning unit 14, moves back and forth in parallel motion, with a predetermined speed relation to the first scanning unit 14.

The reflected optical image of the original, deflected by the third mirror 15b of the second scanning unit 15, is reduced by the optical lens 16, thus focusing the optical image at a predetermined location, and the focused optical image is sequentially photoelectrically converted and outputted as electrical signals by the three-line CCD (charge coupled device) line sensor 17, which is a photoelectric conversion element. Then, the original image information, converted into electrical signals by the CCD line sensor 17, is transferred to an image processing section, to be discussed below, where it undergoes predetermined processing as image data.

The following will explain the image-forming section 20 of the copy machine main body 1.

In the lower part of the image-forming section 20 is provided a paper supply structure 21, in which paper P, stacked in a paper tray, is supplied one sheet at a time toward the laser recording sections to be discussed below. Then, the transport timing of the paper P, supplied one sheet at a time, is controlled by a pair of resist rollers 22 provided prior to the laser recording sections. Further, during double-sided copying, in concert with the operations of the laser recording sections, the resist rollers 22 re-supply to the laser recording sections the paper P with an image formed on one side thereof, which has been turned over.

Above the paper supply structure 21 of the image-forming section 20, a transfer transport belt structure 23 is provided substantially horizontally. In the transfer transport belt structure 23, the paper P is electrostatically attached to and transported by a transfer transport belt 26 stretched between a driving roller 24, a driven roller 25, and other rollers.

In the downstream transport direction from the transfer transport belt structure 23 is provided a fixing device 27, for fixing to the paper P a toner image transferred thereto. The paper P which has passed through a fixing roller nip of the fixing device 27 passes through a transport direction switching gate 28 and is discharged by a discharge roller 29 into a discharge tray 30 attached to the outer wall of the copy machine main body 1.

The switching gate 28 selectively switches the paper transport channel so that the paper P after fixing is either discharged to the exterior of the copy machine main body 1 or resupplied toward the image-forming section 20. Paper P sent back toward the image-forming section 20 by the switching gate 28 is turned over by passing through a switchback transport channel 31, and is then re-supplied to the image-forming section 20.

Above and in close proximity to the transfer transport belt 26 of the image-forming section 20 are provided, adjacent to one another, first, second, third, and fourth image-forming stations PY, PM, PC, and PBk, respectively, in that order from the upstream paper transport direction.

The transfer transport belt 26 is friction driven by the driving roller 24 in the direction of the arrow Z in FIG. 2, and, as mentioned above, holds the paper P supplied from the paper supply structure 21 and transports it to each image-forming station PY, PM, PC, and PBk, in that order.

The image-forming stations PY, PM, PC, and PBk have, in practice, the same structure, and include photoreceptor drums 32Y, 32M, 32C, and 32Bk, respectively, which are rotated in the direction of the arrows in FIG. 2. Around the circumference of each photoreceptor drum 32Y through 32Bk are provided, in order in the rotation direction thereof, chargers 33Y, 33M, 33C, and 33Bk, which give each photoreceptor drum 32Y through 32Bk a uniform charge; developing devices 34Y, 34M, 34C, and 34Bk, which develop the electrostatic latent images formed on the respective photoreceptor drums 32Y through 32Bk; transfer dischargers 35Y, 35M, 35C, and 35Bk, which transfer the respective developed toner images to the paper P; and cleaning devices 36Y, 36M, 36C, and 36Bk, which remove remaining toner from the respective photoreceptor drums 32Y through 32Bk.

Further, above the photoreceptor drums 32Y through 32Bk are provided laser beam scanner units (laser recording sections) 37Y, 37M, 37C, and 37Bk, respectively, each of which is made up of the following members (not shown): a semiconductor laser element, which produces dot light modulated in accordance with the image data; a deflector device, which deflects the light from the semiconductor laser element in a primary scanning direction; an fθ lens, which focuses the light deflected by the deflector device onto the photoreceptor drum; etc.

Pixel signals corresponding to a yellow component image of the color original image are inputted to the laser beam scanner unit 37Y, and respective pixel signals corresponding to magenta, cyan, and black component images are inputted to the laser beam scanner units 37M, 37C, and 37Bk, respectively.

By this means, electrostatic latent images corresponding to color-converted original image information are formed on the photoreceptor drums 32Y through 32Bk of the respective laser recording sections, and, since the developing devices 34Y, 34M, 34C, and 34Bk of the respective laser recording sections hold yellow toner, magenta toner, cyan toner, and black toner, respectively, the original image information color converted by each laser recording section is reproduced as toner images of each color. The detailed structure of the laser beam scanner units 37Y, 37M, 37C, and 37Bk, along with explanation of parts distinctive to the present embodiment, will be discussed later.

Further, between the paper supply structure 21 and the first image-forming station PY is provided a paper attachment charger 38, made of a brush. The paper attachment charger 38 charges the surface of the transfer transport belt 26. By this means, the paper P supplied from the paper supply structure 21 is securely attached to the transfer transport belt 26 and is transported from the first image-forming station PY through the fourth image-forming station PBk without becoming misaligned.

Almost directly above the driving roller 24 between the fourth image-forming station PBk and the fixing device 27 is provided a charge eliminating discharger (not shown), to which is applied an alternating current for separating the paper P from the transfer transport belt 26 to which it is electrostatically attached.

In a color digital copy machine with the foregoing structure, cut sheets of paper are used for the paper P. When a sheet of paper P is sent from the paper tray and supplied between guides of the paper supply transport channel of the paper supply structure 21, the front end of the paper P is detected by a sensor (not shown), and, by means of a detecting signal from the sensor, the paper P is temporarily stopped by the resist rollers 22.

Then, in the case of color mode, the timing of supply of the paper P to the transfer transport belt 26 is synchronized with the timing of operating the image-forming stations PY, PM, PC, and PBk. The transfer transport belt 26 is rotating in the direction of the arrow Z in FIG. 2. Again, in the case of monochrome mode, the paper P is sent to the transfer transport belt 26 in synchronization with the timing of operating the fourth image-forming station PBk. At this time, the transfer transport belt 26 has been given a predetermined charge by the attachment charger 38, and thus the paper P is transported stably as it passes the image-forming stations PY, PM, PC, and PBk.

In color mode, each image-forming station PY, PM, PC, and PBk forms a toner image of its respective color, which is transferred to the surface of the paper P electrostatically attached to and transported by the transfer transport belt 26, and when transfer of the image from the fourth image-forming station PBk is complete, the paper P, beginning with its front end, is separated from the transfer transport belt 26 by the charge eliminating discharger and guided to the fixing device 27. After fixing, the paper P with the toner image fixed thereon is discharged through a paper discharge opening into the discharge tray 30.

In monochrome mode, on the other hand, only the fourth image-forming station PBk forms a toner image in black, which is transferred to the surface of the paper P electrostatically attached to and transported by the transfer transport belt 26, and then, after fixing of the toner image as above, the paper P is discharged.

In the color digital copy machine according to the present embodiment, copying speed differs for monochrome and color modes, with copying speed in monochrome mode set faster than that in color mode. For this reason, in monochrome mode, process speeds such as the speed of the transfer transport belt 26, the surface speed of the photoreceptor drum 32Bk of the fourth image-forming station PBk used in monochrome copying, etc. are set faster than process speeds in color mode. Further, in the laser beam scanner unit 37Bk of the fourth image-forming station PBk used in monochrome copying, two scanning modes are set. In a first scanning mode, during monochrome copying, a black toner image is formed on the photoreceptor drum 32Bk at a higher speed than toner images are formed in the first, second, and third image-forming stations PY, PM, and PC. In a second scanning mode, on the other hand, during color copying, a black toner image is formed on the photoreceptor drum 32Bk at the same speed as toner images are formed in the first, second, and third image-forming stations PY, PM, and PC.

Figure 3:
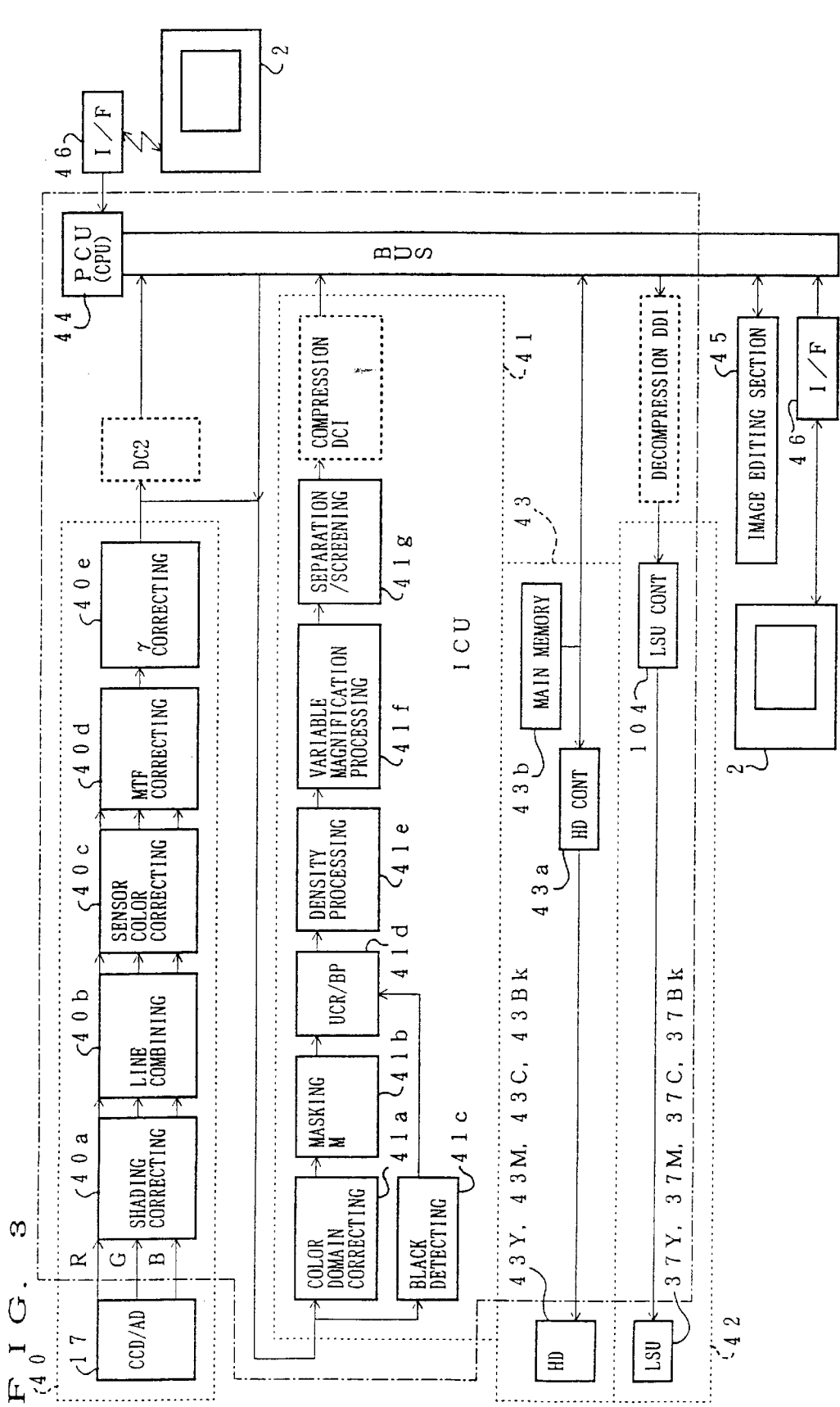
FIG. 3 is a block diagram showing the circuit structure of an image processing section of the foregoing color digital copy machine.

The following will explain, with reference to FIG. 3, the structure and operations of an image processing section installed in the color digital copy machine, which performs image processing of color image information.

As shown in FIG. 3, the image processing section is made up of an image data input section 40, an image data processing section (ICU: image control unit) 41, an image data output section 42, an image memory 43, a print control unit (hereinafter referred to as "PCU") 44, an image editing section 45, and an external interface (I/F) section 46.

The image data input section 40 is made up of the foregoing three-line CCD line sensor 17 (see FIG. 2), which reads a color original image and outputs line data which is color separated into YMC (yellow, magenta, cyan) color components; a shading correcting circuit 40a, which corrects the line image level of line data read by the CCD line sensor 17; a line combining section 40b, made of a line buffer, etc. which corrects misalignment of image line data read by the CCD line sensor 17; a sensor color correcting section 40c, which corrects color data of the line data for each color outputted from the CCD line sensor 17; an MTF (modulation transfer function) correcting section 40d, which corrects variation in the signals for each pixel so as to impart modulation; a γ correcting section 40e, which performs visibility correction by correcting light and dark of the image; etc.

The image data processing section 41 is made up of a color domain correcting circuit 41a, which corrects color reproducing domains of color image signals inputted through the image data input section 40 or through the external interface section 46 to be discussed below, into color reproducing domains in the color toners of the image-forming section 20; a masking circuit 41b, which converts RGB (red, green, blue) signals of inputted image data into YMC signals tailored to the image-forming stations PY, PM, PC, and PBk of the image-forming section 20; a black detecting circuit 41c, which detects a black component from color image RGB signals inputted through the image data input section 40 or through the external interface section 46 to be discussed below; an under-color removal/black plus (UCR/BP) circuit 41d, which performs under-color removal processing (detecting of black based on the YMC signals outputted from the masking circuit 41b) and black plus processing (adding a black component signal outputted from the black detecting circuit 41c); a density processing circuit 41e, which adjusts density of the color image signals based on a density conversion table; a variable magnification processing circuit 41f, which performs magnification conversion of the inputted image information based on a set magnification factor; a separation/screening circuit 41g, which, based on the inputted image data, performs domain separation by detecting character, photograph, and halftone dot domains of the image information, and determines an output pattern for the image; etc.

The image data output section 42 is made up of a laser control (LSU CONT) unit 104, which performs pulse-width modulation based on the image data for each color, and the aforementioned laser beam scanner units (LSUs) 37Y, 37M, 37C, and 37Bk (see FIG. 2), which perform laser recording based on the pulse-width modulated signals, corresponding to the image data for each color, outputted by the laser control unit 104.

The image memory 43 is made up of a main memory 43b made of a RAM (random access memory) such as a semiconductor memory; four hard disks (HDs) 43Y, 43M, 43C, and 43Bk, each made of a rotating memory medium; and a hard disk control (HD CONT) unit 43a, which controls the hard disks 43Y through 43Bk.

Each of the hard disks 43Y through 43Bk stores 8-bit, four-color image data of a single color.

Eight-bit, four-color (32-bit) image data serially outputted by the image data processing section 41 is sequentially received and temporarily stored in a buffer by the hard disk control unit 43a. The hard disk control unit 43a converts the 32-bit data to 8-bit, four-color image data, and, in order to store the image data separately by color, outputs the 8-bit, four-color image data in parallel to the respective hard disks 43Y, 43M, 43C, and 43Bk.

The PCU 44, made of a CPU (central processing unit), controls the image data input section 40, the image data processing section 41, the image data output section 42, the image memory 43, and the image editing section 45 and the external interface section 46 to be discussed below, on the basis of a predetermined sequence, and also controls the color digital copy machine as a whole.

The image editing section 45 performs predetermined image editing of image data temporarily stored in the image memory 43, which has passed through the image data input section 40 and the image data processing section 41, or the external interface section 46 to be discussed below.

The external interface section 46 is a communications interface means for receiving image data from an external image input processing device 2 provided separately from the color digital copy machine. Image data inputted from the external interface section 46 is also first inputted into the image data processing section 41, which performs color domain correction, etc. in order to convert this external data to a data level which can be handled by the image-forming section 20 of the color digital copy machine, and is then stored in the hard disks 43Y, 43M, 43C, and 43Bk.

The color digital copy machine is controlled by the PCU 44. The control system for control by the PCU 44 is as shown in FIG. 4.

Figure 4:
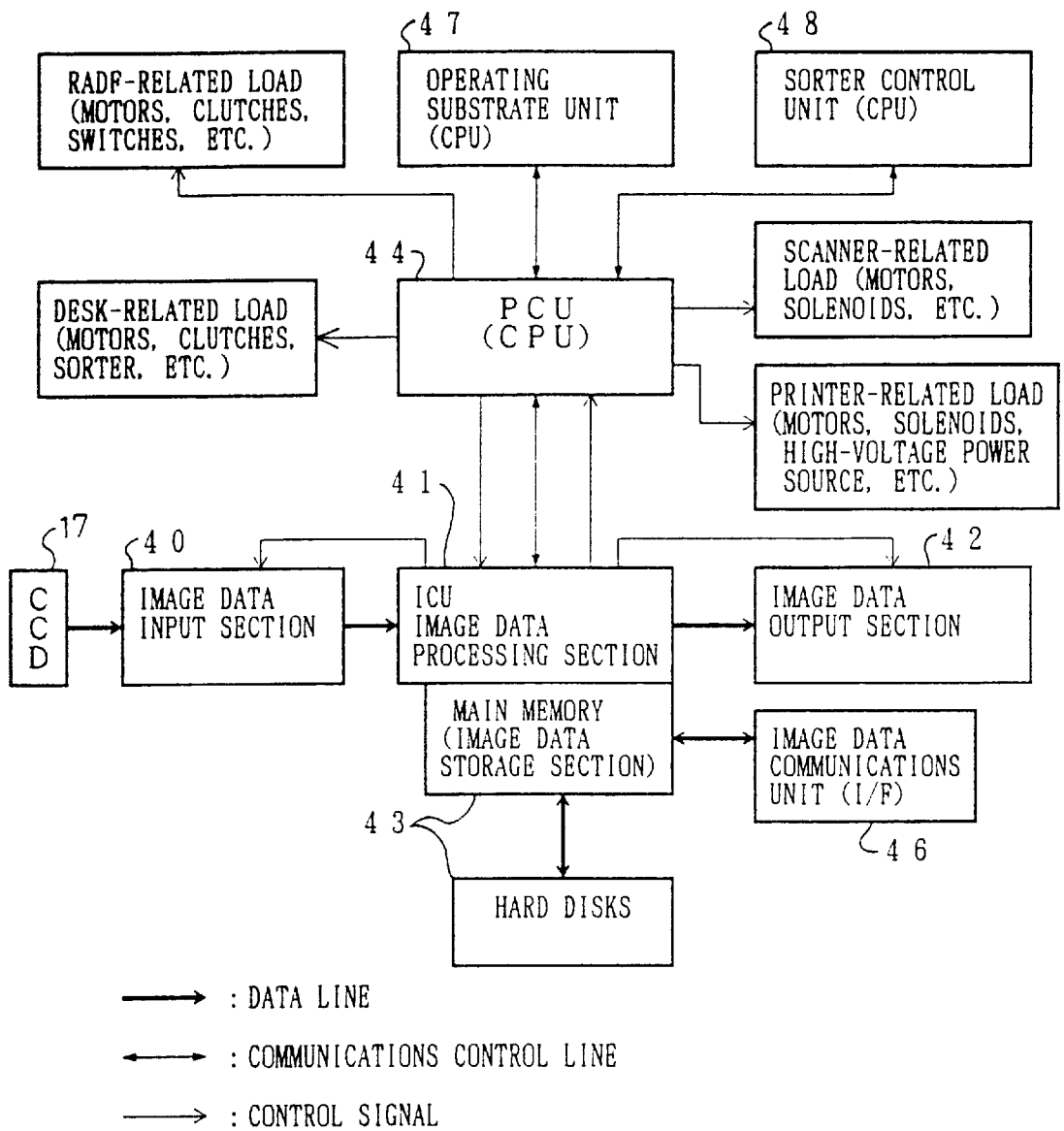
FIG. 4 is a block diagram showing a control system of the foregoing color digital copy machine.

As shown in FIG. 4, to the PCU 44 are connected a desk-related load, an RADF-related load, an operating substrate unit 47, a sorter control unit 48, a scanner-related load, a printer-related load, and the image data processing section 41.

The PCU 44 manages the foregoing sections by means of sequence control, and, during control, outputs control signals to each section. The desk-related load is the load of motors, clutches, etc. of devices other than the copy machine main body 1, i.e., of a multi-cassette paper supply unit and the sorter of a post-processing device (not shown). The RADF-related load is the load of motors, clutches, switches, etc. of the automatic original feeding device (RADF) 12. The scanner-related load is the load of motors, solenoids, etc. of the image-reading section 10. The sorter control unit 48 includes a CPU, and controls the operations of the sorter based on control signals from the PCU 44. The printer-related load is the load of motors, solenoids, high-voltage power source, etc. of the image-forming section 20.

Further, in the color digital copy machine according to the present embodiment, the PCU 44 also functions as process speed switching means, which, in controlling the printer-related load, as will be discussed below, switch process speeds in accordance with the respective copying speeds of monochrome and color modes, and also switch the scanning mode of the black laser beam scanner unit 37Bk between the first and second scanning modes, thereby realizing the foregoing monochrome and color modes.

The operating substrate unit 47 is an input section which allows the user to input to the color digital copy machine various settings, commands, etc. regarding copying mode, etc., and includes a CPU. The operating substrate unit 47 transfers to the PCU 44 control signals corresponding to settings inputted by the user regarding, for example, copying mode.

Based on the foregoing control signals, the PCU 44 operates the color digital copy machine in accordance with the foregoing modes. The PCU 44 also transfers to the operating substrate unit 47 control signals showing the state of operation of the color digital copy machine. On the basis of these control signals, the operating substrate unit 47 informs the user of the current state of operations of the color digital copy machine by displaying that state by means of a display section.

An image data communications unit is connected to the main memory 43b of the image memory 43, which is connected to the image data processing section 41. The image data communications unit includes the external interface 46, and is provided to enable data communication of image data, image control signals, etc. with other digital information devices.

Figure 5:
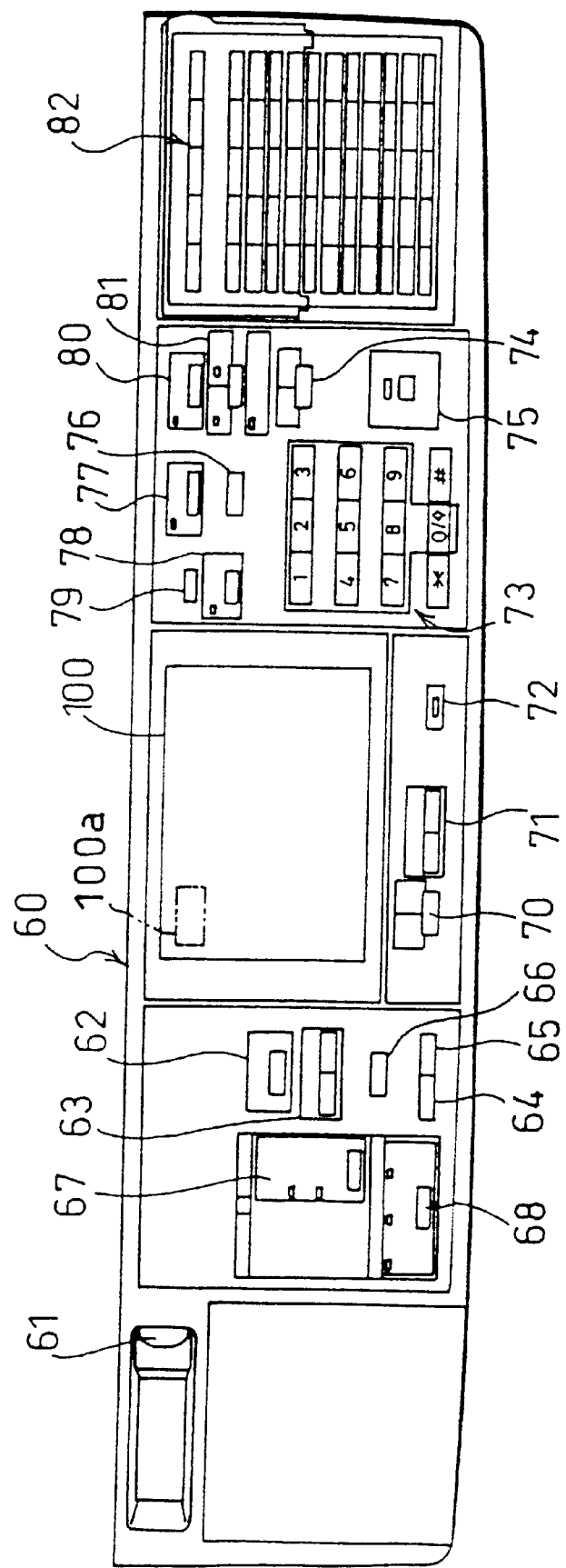
FIG. 5 is a plan view showing the structure of an operating panel section of the foregoing color digital copy machine.

The operating substrate unit 47 is provided with an operating panel 60, shown in FIG. 5, as an input section. In the central portion of the operating panel 60 is provided a liquid crystal display device 100, which is a touch-panel-type display section. On a portion of the screen of the liquid crystal display device 100 is provided a screen switching command area 100a. The screen switching command area 100a is for input of a command for switching the screen displayed on the liquid crystal display device 100 to a screen for selecting image editing functions. When the user operates the screen switching command area 100a by directly pressing with a finger, the screen of the liquid crystal display device 100 displays the various editing functions in order to allow selecting of desired functions. At this time, if the user presses, among the display areas of the various editing functions, the display area of a desired editing function, that editing function is set.

Further, on the operating panel 60, at the left end in FIG. 5, is provided a brightness adjustment dial 61, for adjusting the brightness of the screen of the liquid crystal display device 100. Between the dial 61 and the liquid crystal display device 100 are provided an automatic magnification setting key 62, a zoom key 63, fixed magnification keys 64 and 65 and a full-size key 66, a double-sided mode setting key 67, and a post-processing mode setting key 68. The automatic magnification setting key 62 is for setting a mode which automatically selects copying magnification, and the zoom key 63 is for setting copying magnification in 1% increments. The fixed magnification keys 64 and 65 are for selecting fixed copying magnifications, and the full-size key 66 is for returning copying magnification to a standard magnification (full size). The double-sided mode setting key 67 is for setting a double-sided copying mode, and the post-processing mode setting key 68 is for setting an operating mode of a post-processing device which sorts copies discharged by the color digital copy machine.

Further, below the liquid crystal display device 100 in FIG. 5 are provided a density switching key 70, a density adjustment key 71, and a tray selection key 72.

The density switching key 70 is for switching copying density adjustment from automatic to manual or photograph mode, and the density adjustment key 71 is for fine adjustment of density level in manual mode or photograph mode. The tray selection key 72 is for selecting a desired paper size from among sizes of paper set in the paper trays of the color digital copy machine.

Further, to the right of the liquid crystal display device 100 in FIG. 5 are provided copy quantity setting keys 73, a clear key 74, a copy start key 75, a clear all key 76, an interrupt copying key 77, an operating guide key 78, a message scroll key 79, a memory transmission mode key 80, a copy/fax mode switching key 81, and one-touch dial keys 82.

The copy quantity setting keys 73 are for setting the number of copies to be made, and the clear key 74 is operated to clear the number of copies set or to stop successive copying. The copy start key 75 is for commanding commencement of copying, and the clear all key 76 is for cancelling all modes currently set and returning to a standard state. The interrupt copying key 77 is operated when, during successive copying, the user wishes to copy a different original. The operating guide key 78 is operated when the user does not understand how to operate the color digital copy machine, and when this is operated, the method of operating the color digital copy machine is displayed on the liquid crystal display device 100. The message scroll key 79 switches messages displayed by operation of the operating guide key 78 by scrolling.

The memory transmission mode key 80, the copy/fax mode switching key 81, and the one-touch dial keys 82 are setting keys relating to facsimile mode. The memory transmission mode key 80 is for commanding that an image be first stored in memory and then transmitted. The copy/fax mode switching key 81 switches the mode of the color digital copy machine between copy and facsimile mode. The one-touch dial keys 82 are for dialing, with one-touch operation, telephone numbers which have previously been stored in the color digital copy machine.

Incidentally, the foregoing structure of the operating panel 60 as regards the types and arrangement of the various keys is merely one example, and may vary according to the various functions of which the color digital copy machine is capable.

Next, structural points distinctive to the color digital copy machine according to the present embodiment will be discussed in detail.

First, the structure of the laser beam scanner units 37Y, 37M, 37C, and 37Bk will be explained in detail with reference to FIGS. 6 through 8. However, the laser beam scanner unit 37Y, to which image signals corresponding to a yellow component image are inputted, will be explained as an example here, and since each of the other laser beam scanner units 37M, 37C, and 37Bk has an equivalent structure, explanation thereof will be omitted.

Figure 6:
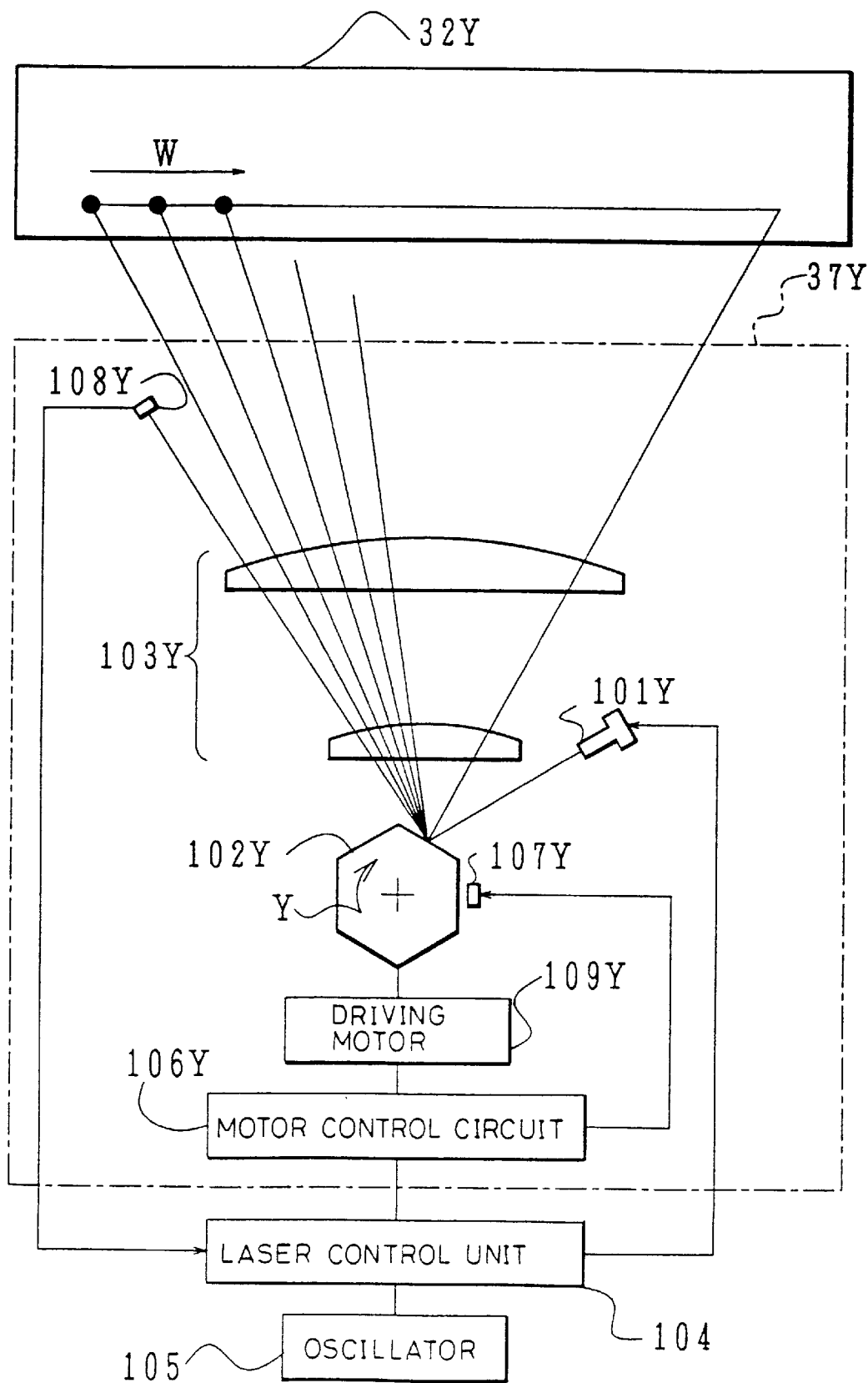
FIG. 6 is an explanatory drawing showing the structure of a laser beam scanner unit (for yellow) of the foregoing color digital copy machine.

As shown in FIG. 6, in the laser beam scanner unit 37Y, laser light is emitted by a laser projecting section (laser light source(s)) 101Y, deflected by a rotating polygon mirror (hereinafter referred to as "polygon mirror") 102Y, which rotates at high speed, projected through a lens system 103Y, and scans the photoreceptor drum 32Y. The role of the lens system 103Y is to deflect the laser light deflected from the polygon mirror 102Y, which rotates with motion of angular velocity, so that the light is able to scan the photoreceptor drum 32Y with linear motion of constant velocity. An integrally structured driving motor 109Y rotates the polygon mirror 102Y in the direction of the arrow Y in the Figure, thus causing the laser light deflected thereby to scan in the direction of the arrow W in the Figure. In the present embodiment, the polygon mirror 102Y has the shape of a hexagon having six mirror surfaces, and thus a maximum of six laser scans can be made with one rotation of the polygon mirror 102Y.

Further, the laser beam scanner unit 37Y is controlled by a laser control unit 104 provided externally thereto. The laser control unit 104 is provided with an oscillator 105 which produces a base clock, and the laser control unit 104, based on the base clock, produces a driving clock corresponding to a predetermined number of rotations of the polygon mirror 102Y needed during image recording, and provides this driving clock to the laser beam scanner unit 37Y, and also controls starting and stopping of rotation, waiting, etc.

In the interior of the laser beam scanner unit 37 are provided a motor control circuit 106Y, which receives signals from the laser control unit 104, and a tachogenerator 107Y, which continually monitors the number of rotations of the polygon mirror 102Y. The motor control circuit 106Y continually compares the driving clock received from the laser control unit 104 with a signal received from the tachogenerator 107Y, and performs power control of the driving motor 109Y such that the polygon mirror 102Y rotates at a constant velocity of a predetermined number of rotations per minute.

Further, the laser beam scanner 37Y is internally provided with a beam detector (hereinafter referred to as "BD") 108Y, which is a sensor which senses the laser light at a position prior to the position at which writing of the laser light is commenced. The BD 108Y outputs a BD signal expressing an active level each time the sensor senses that the laser light has arrived at the writing commencement position. By means of a BD signal received from the BD 108Y, the laser control unit 104 is informed that the laser light has reached the writing commencement position, and normally, each time a BD signal is detected, the laser control unit 104 executes writing by providing the laser projecting section 101Y with a writing signal corresponding to image data.

Figure 7:
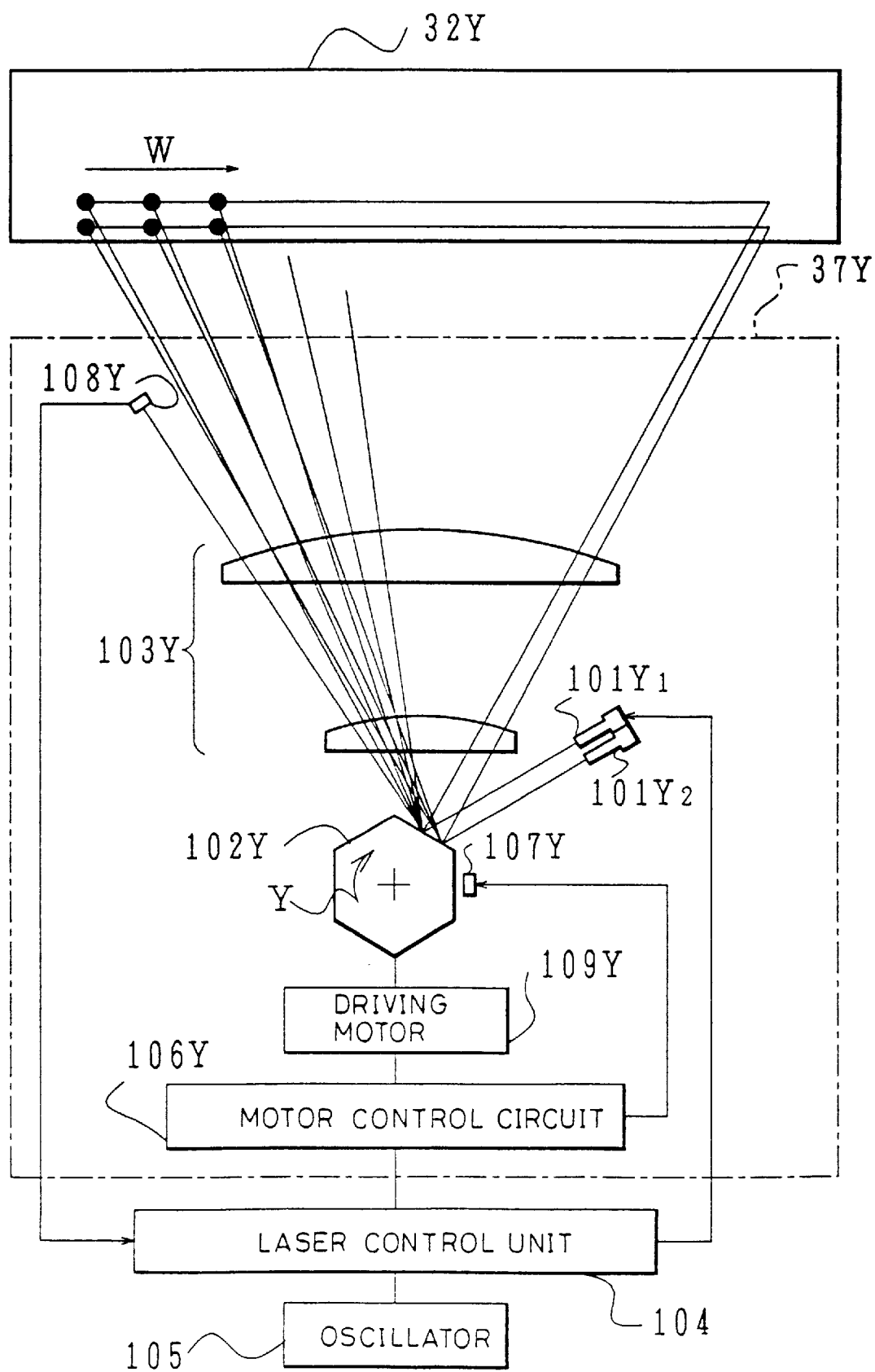
FIG. 7 is an explanatory drawing showing another structure for a laser beam scanner unit (for yellow) of the foregoing color digital copy machine.

Incidentally, FIG. 6 shows a structure provided with a single laser projecting section 101, but a structure like that shown in FIG. 7 is also possible, in which a plurality (two in FIG. 7) of laser projecting sections 101Y$_1$ and 101Y$_2$ are provided, thereby enabling writing of a plurality of lines with a single scan.

Figure 8:
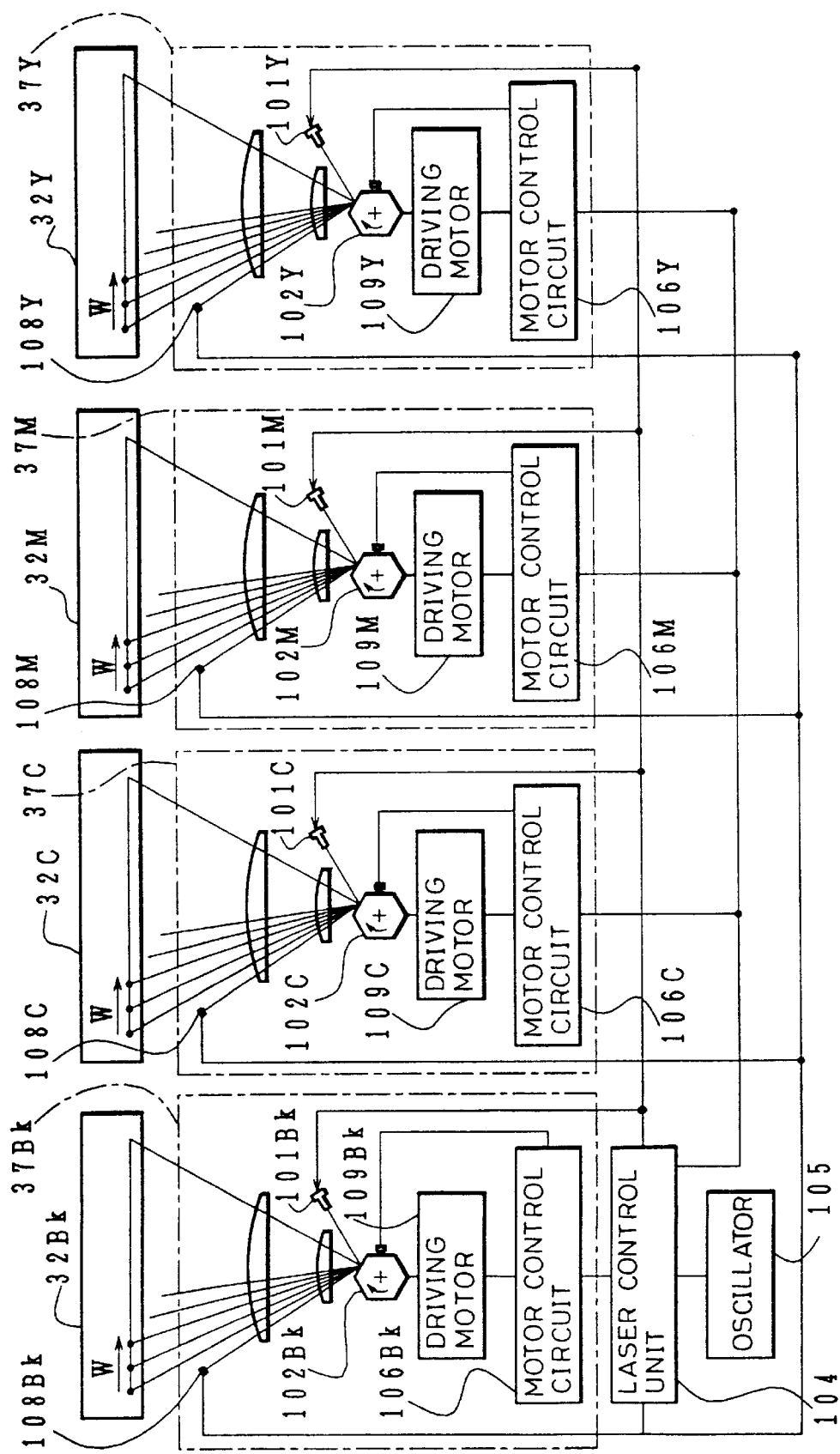
FIG. 8 is an explanatory drawing showing the overall structure of four laser beam scanner units of the foregoing color digital copy machine.

Laser beam scanner units 37Y, 37M, 37C, and 37Bk with the foregoing structure are provided above the transfer transport belt 26 (see FIG. 2), in the order yellow, magenta, cyan, black, as shown in FIG. 8, and the laser control unit 104, based on the base clock produced by the oscillator 105, produces and distributes driving clocks to each of the motor control circuits 106Y, 106M, 106C, and 106Bk of the laser beam scanner units 37Y, 37M, 37C, and 37Bk, respectively.

As mentioned above, in this kind of color digital copy machine, it is customary to set monochrome copying speed faster than color copying speed. For this reason, the driving clocks distributed to the laser beam scanner units 37Y, 37M, and 37C for yellow, magenta, and cyan, respectively, are the same, and a driving clock of higher speed, i.e., higher frequency, is provided to the laser beam scanner unit 37Bk for black.

Consequently, the polygon mirrors 102Y, 102M, and 102C of the laser beam scanner units 37Y, 37M, and 37C for yellow, magenta, and cyan, respectively, are rotated at the same speed, and the polygon mirror 102Bk of the laser beam scanner unit 37Bk for black is rotated at a higher speed than the other polygon mirrors 102Y, 102M, and 102C.

However, when the laser beam scanner unit 37Bk, provided with the polygon mirror 102Bk which is rotated at a higher speed than those of the other colors, is used in color mode, it is necessary to bring the scanning density thereof into conformity with the scanning density of the laser beam scanner units 37Y, 37M, and 37C for the other colors. Conventionally, a structure much used was one which brought the respective scanning densities into conformity by reducing the high rotation speed of the polygon mirror 102Bk of the laser beam scanner unit 37Bk for black to bring it into conformity with the rotation speed of the polygon mirrors 102Y, 102M, and 102C of the laser beam scanners 37Y, 37M, and 37C for the other colors.

In contrast, in the color digital copy machine according to the present embodiment, the rotation speed of the polygon mirror 102Bk of the laser beam scanner unit 37Bk for black is not changed at all, but by skipping certain mirror surfaces thereof, the respective scanning densities of the laser beam scanner unit 37Bk for black and the laser beam scanner units 37Y, 37M, and 37C for the other colors are brought into conformity.

In other words, two scanning modes are set in the laser beam scanner unit 37Bk for black: a first scanning mode, for monochrome copying at high copying speed, in which scanning is performed using all of the mirror surfaces of the polygon mirror 102Bk, and a second scanning mode, for color copying at low copying speed, in which some of the mirror surfaces of the polygon mirror 102Bk are not used, i.e., are skipped.

Figure 1:
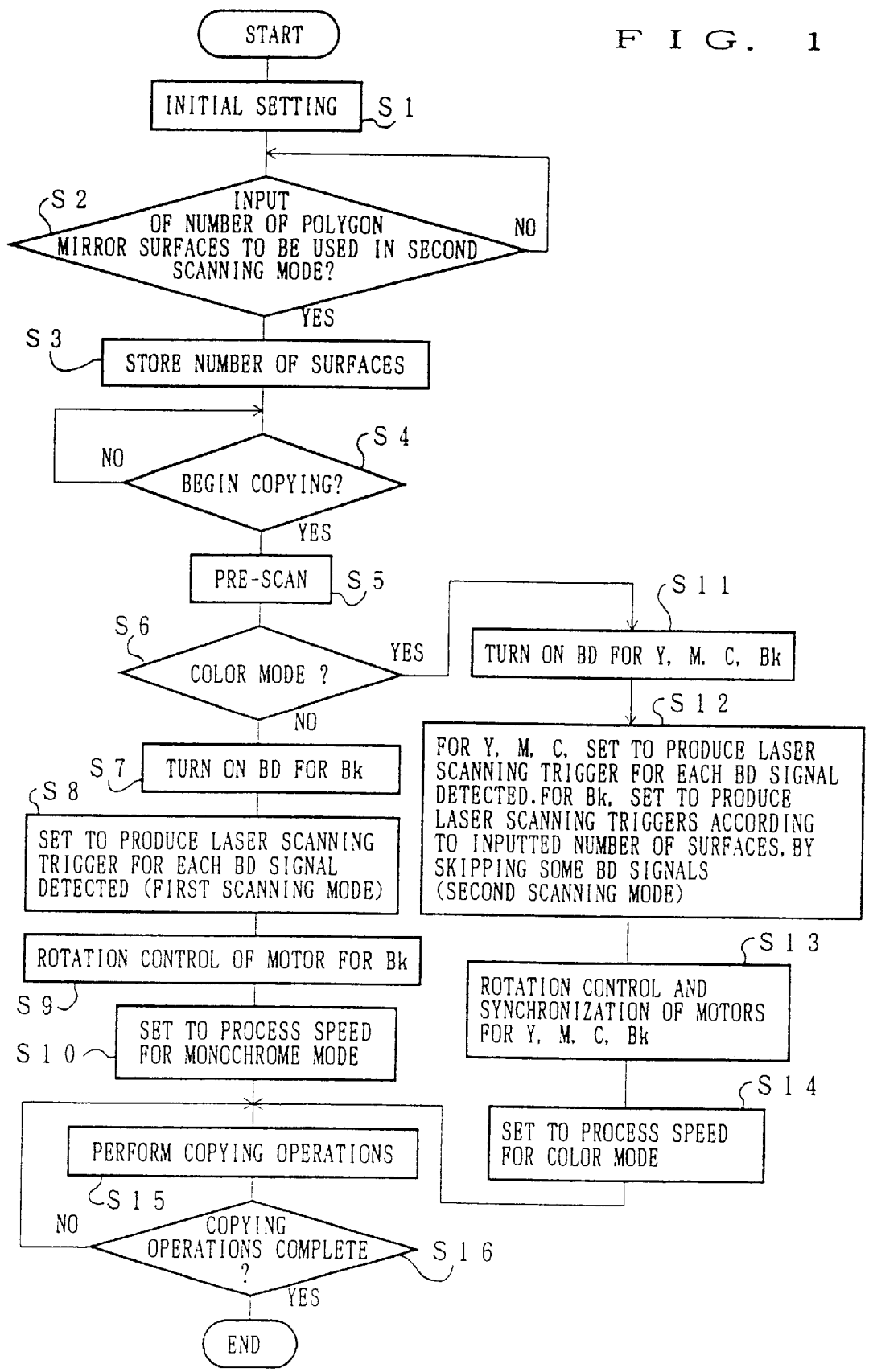
FIG. 1 is a flow-chart showing operation steps during copying in a color digital copy machine according to a first embodiment of the present invention.

The following will explain, based on the flow-chart in FIG. 1 and with reference to FIGS. 2 and 8, operation steps during copying in the color digital copy machine, with special attention to control operations for performing color copying by bringing the scanning density of the laser beam scanner unit 37Bk for black into conformity with that of the laser beam scanner units 37Y, 37M, and 37C for the other colors by skipping certain mirror surfaces of the polygon mirror 102Bk.

First, in initial setting, the various loads necessary in copying operations are returned to initial positions or perform initial operations (S1).

Next, after the user inputs the number of mirror surfaces (a predetermined value) of the polygon mirror 102Bk to be used in the second scanning mode (S2), the inputted value is stored in a predetermined memory area of the main memory 43*b* (S3). Input of the number of mirror surfaces to be used is performed by the user in a simulation mode. The mode is switched to the simulation mode by operating a specific key on the operating panel 60 shown in FIG. 5.

The number of surfaces inputted by the user here is determined by the total number of mirror surfaces of the polygon mirror 102Bk and a ratio of the process speed of monochrome mode to the process speed of color mode. In other words, when the laser projecting sections 101Y, 101M, 101C, and 101Bk of each laser beam scanner unit 37Y, 37M, 37C, and 37Bk use equal numbers of laser light sources, the ratio between the process speeds of the respective modes is equivalent to the ratio between the rotation speed of the polygon mirror 102Bk for black and the rotation speed of the polygon mirrors 102Y, 102M, and 102C for the other colors. Accordingly, if the process speed of monochrome mode is set to, for example, double the process speed of color mode, the scanning densities of the respective modes can be made equivalent by using three of the six mirror surfaces of the polygon mirror 102Bk. Accordingly, the user inputs "3."

Incidentally, in the present explanation, the total number of mirror surfaces of the polygon mirror 102Bk and the respective process speeds of color and monochrome modes are values fixed in advance.

After input of the number of surfaces to be used, operations wait until there is a command to begin copying (S4), and upon detection of the user's command for commencement of copying, image information of the original is read by conducting a pre-scan thereof (S5), and it is determined from the result of the pre-scan whether to use color or monochrome mode (S6). In other words, when the read original is a color original, color mode is determined, and when it is a monochrome original, monochrome mode is determined.

Figure 9:
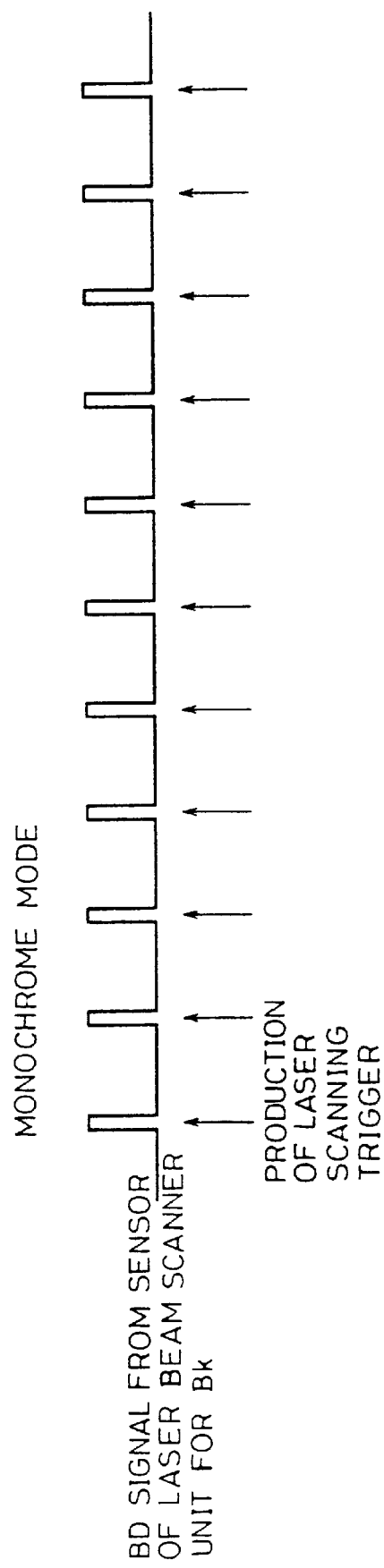
FIG. 9 is an explanatory drawing showing a BD signal and timing for producing laser scanning triggers in a monochrome mode (first scanning mode) of the foregoing color digital copy machine.

Here, when monochrome mode is determined, in order to inform the laser control unit 104 of the writing commencement position for each surface of the polygon mirror 102Bk, the BD 108Bk of the laser beam scanner unit 37Bk is turned ON (S7), and the laser control unit 104 is set so as to produce, as shown in FIG. 9, a laser scanning trigger (i.e., a control signal) each time a BD signal corresponding to a surface of the polygon mirror 102Bk is detected (S8). In this way, the laser beam scanner unit 37Bk for black is prepared for copying operations in the first scanning mode, which uses all surfaces of the polygon mirror 102Bk.

When preparations for copying operations in the first scanning mode are complete, the motor control circuit 106Bk performs rotation control of the driving motor 109Bk which rotates the polygon mirror 102Bk (S9), and sets the process speed to that for monochrome mode (S10).

Then copying operations are performed in the first scanning mode (S15), and when completion of copying operations is detected (S16), operations are ended.

When color mode is determined in S6, on the other hand, each BD 108Y, 108M, 108C, and 108Bk is turned ON so as to detect BD signals, thus informing the laser control unit 104 of the writing commencement position for each surface of the polygon mirrors 102Y, 102M, 102C, and 102Bk (S11). Then, the laser control unit 104 is set as follows (S12).

Namely, for the laser beam scanner units 37Y, 37M, and 37C for yellow, magenta, and cyan, the laser control unit 104 is set so as to produce, as shown in FIG. 10(*a*), a laser scanning trigger each time a BD signal corresponding to a surface of the polygon mirror 102Y, 102M, or 102C is detected. For the laser beam scanner unit 37Bk for black, on the other hand, the laser control unit 104 is not set so as to produce a laser scanning trigger each time a BD signal corresponding to a surface of the polygon mirror 102Bk is detected. Instead, as shown in FIG. 10(*b*), here the laser control unit 104 is set so as to skip some BD signals, i.e., so as to produce, for each rotation of the polygon mirror 102Bk, laser scanning triggers equal in number to the number of surfaces to be used, which was stored in a memory area of the main memory 43*b* in S3 above. More specifically, the laser control unit 104 is set so that, after producing a laser scanning trigger in response to detection of a BD signal, it ignores one BD signal, and then produces the next laser scanning trigger when the following BD signal is detected. Accordingly, the number of BD signals skipped for each rotation of the polygon mirror 102Bk is equal to the total number of mirror surfaces of the polygon mirror 102Bk minus the number of surfaces used, i.e., equal to the number of surfaces not used.

In this way, preparations are made for copying operations in the second scanning mode, which uses all surfaces of the polygon mirrors 102Y, 102M, and 102C for yellow, magenta, and cyan, and uses three of the six surfaces of the polygon mirror 102Bk for black.

Then, the motor control circuits 106Y, 106M, 106C, and 106Bk perform rotation control and synchronization of the driving motors 109Y, 109M, 109C, and 109Bk, respectively, which rotate the polygon mirrors 102Y, 102M, 102C, and 102Bk, respectively (S13), and the process speed is set to that for color mode (S14).

Then copying operations are performed in the second scanning mode (S15), and when completion of copying operations is detected (S16), operations are ended.

In this way, in the color digital copy machine according to the present embodiment, rotation speed of the polygon mirror 102Bk of the laser beam scanner unit 37Bk for black is not changed at all, but by skipping certain mirror surfaces thereof, the scanning density of the laser beam scanner unit 37Bk is brought into conformity with that of the other laser beam scanner units 37Y, 37M, and 37C.

Accordingly, the time required to obtain the first copy can be shortened, and the efficiency of copying operations improved, in comparison with the conventional structure in which the respective scanning densities of the laser beam scanner units for black and for the other colors are brought into conformity by reducing the speed of the high-speed polygon mirror for black to the same speed as the polygon mirrors for the other colors.

Further, here, when three of the six mirror surfaces of the hexagonal polygon mirror 102Bk are used, the timing of producing laser scanning triggers is one in which each laser scan has the same cycle (pattern 1 in FIG. 11), and an equal number of surfaces are skipped between each pair of surfaces used. Accordingly, there is no difference in scanning density, even on the micro level. In contrast, if, for example, the timing of producing laser scanning triggers is one in which each laser scan has a different cycle (such as pattern 2 or 3 in FIG. 11), scanning density is equivalent on the macro level (since three surfaces are used), but on the micro level, unevenness in scanning density arises.

Further, by skipping surfaces as in pattern 1 above, the surfaces used are not adjacent, and thus sufficient time can be devoted to performing image processing of data from one surface of a polygon mirror. Accordingly, this data can be handled without using an expensive image processing substrate capable of high-speed processing, thus contributing to reduction of costs, and the timing of control operations can be controlled comparatively easily.

Further, here, copying speed in monochrome mode is double that in color mode (in other words, process speed in monochrome mode is double that in color mode, and the speed of the polygon mirror 102Bk of the laser beam scanner unit 37Bk, which is used in both monochrome and color mode, is set to double the speed of the polygon mirrors 102Y, 102M, and 102C for the other colors), and each of the polygon mirrors 102Y, 102M, 102C, and 102Bk is hexagonal. In such a structure, in order to bring the scanning density of the laser beam scanner unit 37Bk into conformity with that of the other laser beam scanner units 37Y, 37M, and 37C, "3" is inputted in S3, every other surface of the polygon mirror 102Bk is used, and three laser scans are performed for every rotation thereof.

However, if the color digital copy machine is a type capable of changing (in, for example, the above-mentioned simulation mode) the respective process speed settings for color and monochrome modes and/or the respective rotation speeds of the polygon mirrors 102Y, 102M, 102C, and 102Bk, any number of mirror surfaces of the polygon mirror 102Bk may be used, provided that the surfaces skipped are not adjacent, and that the intervals between surfaces used (the number of surfaces skipped therebetween) are equivalent. In other words, the number of surfaces used may be any divisor of the total number of surfaces of the polygon mirror 102Bk (except for a value equal to the total number of mirror surfaces). For example, when the polygon mirror is square, as shown in FIG. 12(a), every fourth surface is used if "1" is inputted, and every other surface if "2" is inputted. When the polygon mirror is hexagonal, as shown in FIG. 12(b), every sixth surface is used if "1" is inputted, every third surface if "2" is inputted, and every other surface if "3" is inputted. When the polygon mirror is octagonal, as shown in FIG. 12(c), every eighth surface is used if "1" is inputted, every fourth surface if "2" is inputted, and every other surface if "4" is inputted.

However, in this case, the respective process speeds of monochrome and color modes, and the speeds of the polygon mirrors 102Y, 102M, 102C, and 102Bk, should preferably be set so that a plurality of surfaces among the total surfaces of each polygon mirror are used once every predetermined cycle. This is because in a structure in which, for example, one predetermined surface among the plurality of surfaces is used, since the same surface is used every predetermined cycle, uneven deflection of that surface markedly appears in the copy image, and image distortion arises due to the uneven deflection in the primary scanning direction.

For this reason, when a polygon mirror 102 is square, it is preferable to use two surfaces thereof; when a polygon mirror is hexagonal, it is preferable to use two surfaces, and even more preferably three surfaces thereof; when a polygon mirror 102 is octagonal, it is preferable to use two surfaces, and even more preferably four surfaces thereof.

Second Embodiment

Figure 13:
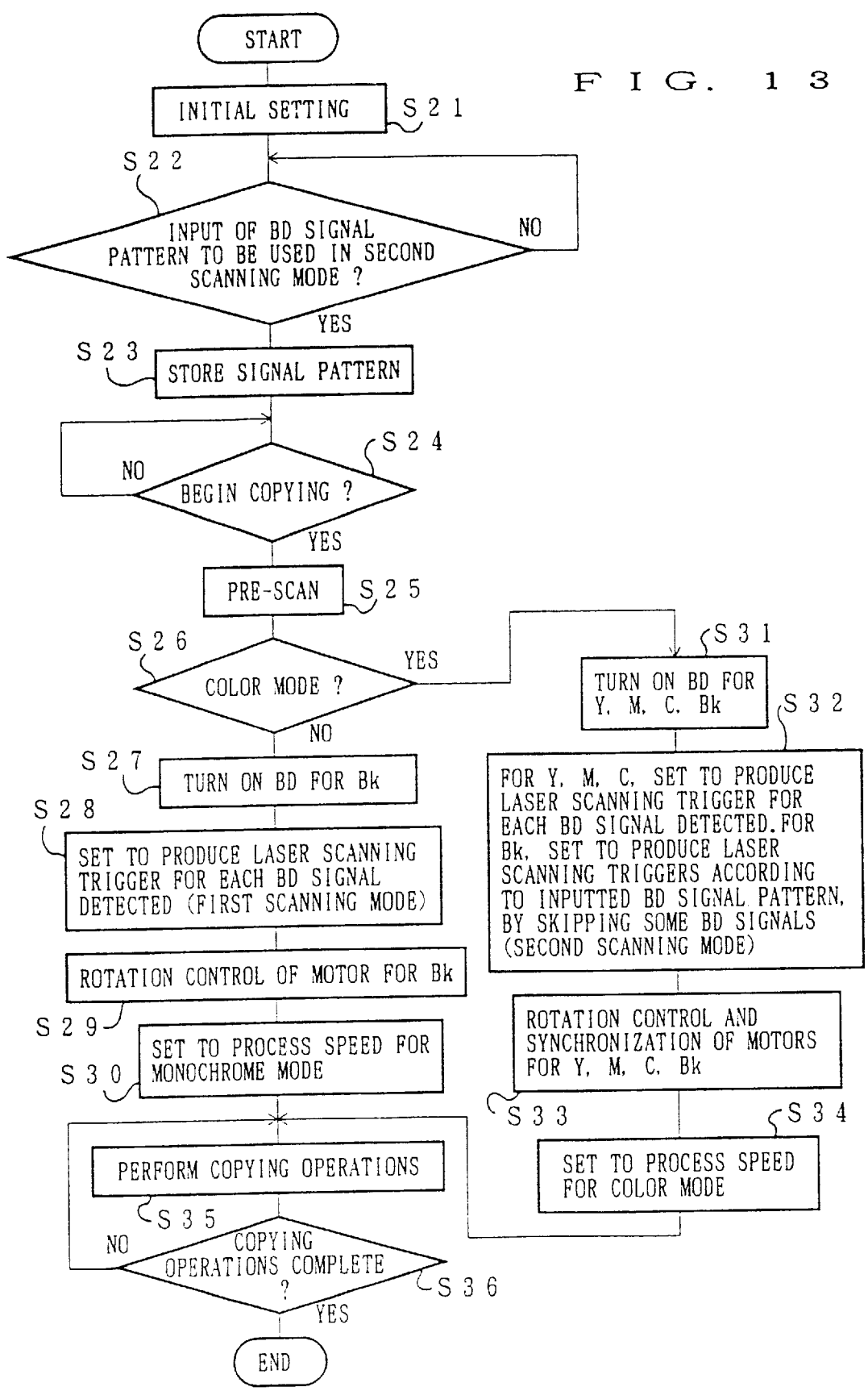
FIG. 13 is a flow-chart showing operation steps during copying in a color digital copy machine according to a second embodiment of the present invention.
Figure 14:
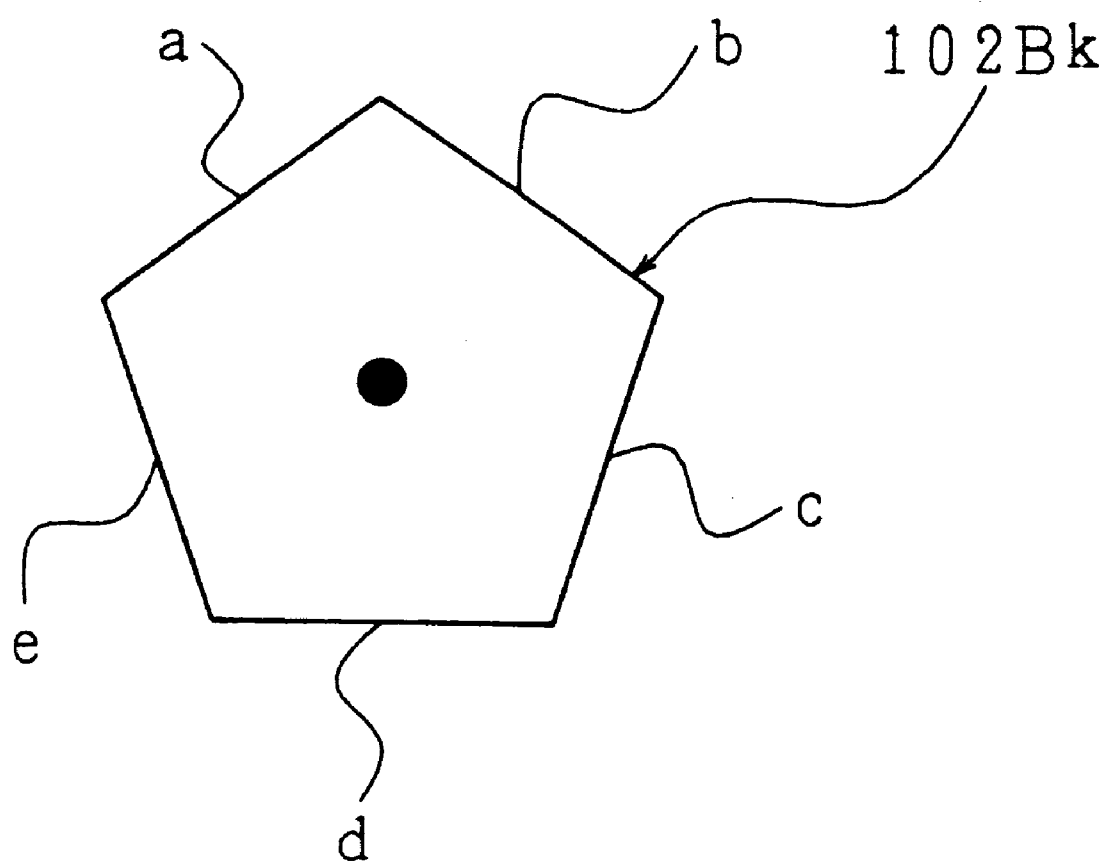
FIG. 14 is an explanatory drawing showing a pentagonal polygon mirror provided in the foregoing color digital copy machine.

The following will explain another embodiment of the present invention with reference to FIGS. 13 and 14. Here, for ease of explanation, members having the same function as members of the first embodiment above will be given the same reference symbols, and explanation thereof will be omitted.

The foregoing embodiment was a structure in which the number of mirror surfaces to be used was inputted by the user. For this reason, if the color digital copy machine is, for example, a type capable of changing, in the above-mentioned simulation mode, the set process speeds of color and monochrome mode and/or the rotation speeds of the polygon mirrors 102Y, 102M, 102C, and 102Bk, the number of mirror surfaces of the polygon mirror 102Bk used may be any divisor of the total number of surfaces of the polygon mirror 102Bk (except for a value equal to the total number of mirror surfaces).

However, if the polygon mirrors 102Y, 102M, 102C, and 102Bk of the laser beam scanner units 37Y, 37M, 37C, and 37Bk have an odd number of surfaces, such as five or seven, with the foregoing inputting of the number of surfaces to be used, the polygon mirror 102Bk for black, which rotates at twice the speed of the other polygon mirrors 102Y, 102M, and 102C, cannot be brought into conformity with the scanning speed of the other polygon mirrors. In other words, with a pentagonal polygon mirror, for example, the only number of surfaces to be used which can be inputted is "1," and when one surface is used, the copying speed in monochrome mode is five times that in color mode.

In this kind of structure provided with a pentagonal polygon mirror, in order to realize a setting like that of the first embodiment, in which copying speed in the monochrome mode is double that in the color mode, it is sufficient to use a structure in which, not the number of surfaces to be used, but a BD signal pattern is inputted.

In other words, it is sufficient to set the BD signal pattern to "1/2," so that, with the pentagonal polygon mirror 102Bk for black shown in FIG. 14, whose rotation speed is set to double that of the polygon mirrors for the other colors, the surface used changes as follows: "a→c→e→b→d→a→. . . " By this means, one scanning trigger can be produced for every two BD signals detected. In this way, whether the total number of mirror surfaces is odd or even, it is possible to use every other surface.

Therefore, in the color digital copy machine according to the present embodiment, the number of surfaces to be used in the second scanning mode is not inputted, but instead the BD signal pattern is inputted. Other than this point, the present color digital copy machine has the same structure as that according to the first embodiment above.

The flow-chart in FIG. 13 shows copying operation steps with inputting of a BD signal pattern instead of the number of polygon mirror surfaces to be used. In S22, when the user, in a simulation mode, inputs a BD signal pattern of "1/2," this BD signal pattern is stored in a predetermined memory area of the main memory 43b (S23). Incidentally, in the present explanation, a structure with a pentagonal polygon mirror is used, and the copying speed in monochrome mode has previously been set to double the copying speed in color mode.

Then, in S32, the laser control unit 104 is set so that, in the laser beam scanner unit 37Bk for black, a laser scanning trigger is produced, not for every BD signal detected, but according to the BD signal pattern "1/2" inputted in S23, and preparations are made to perform copying operations in the second scanning mode.

Except for S22, S23, and S32, the operations in S21 through S36 of the flow-chart shown in FIG. 13 are equivalent to the operations in S1 through S16 (except for S2, S3, and S12) of the flow-chart shown in FIG. 1, and accordingly explanation thereof will be omitted.

Third Embodiment

Figure 15:
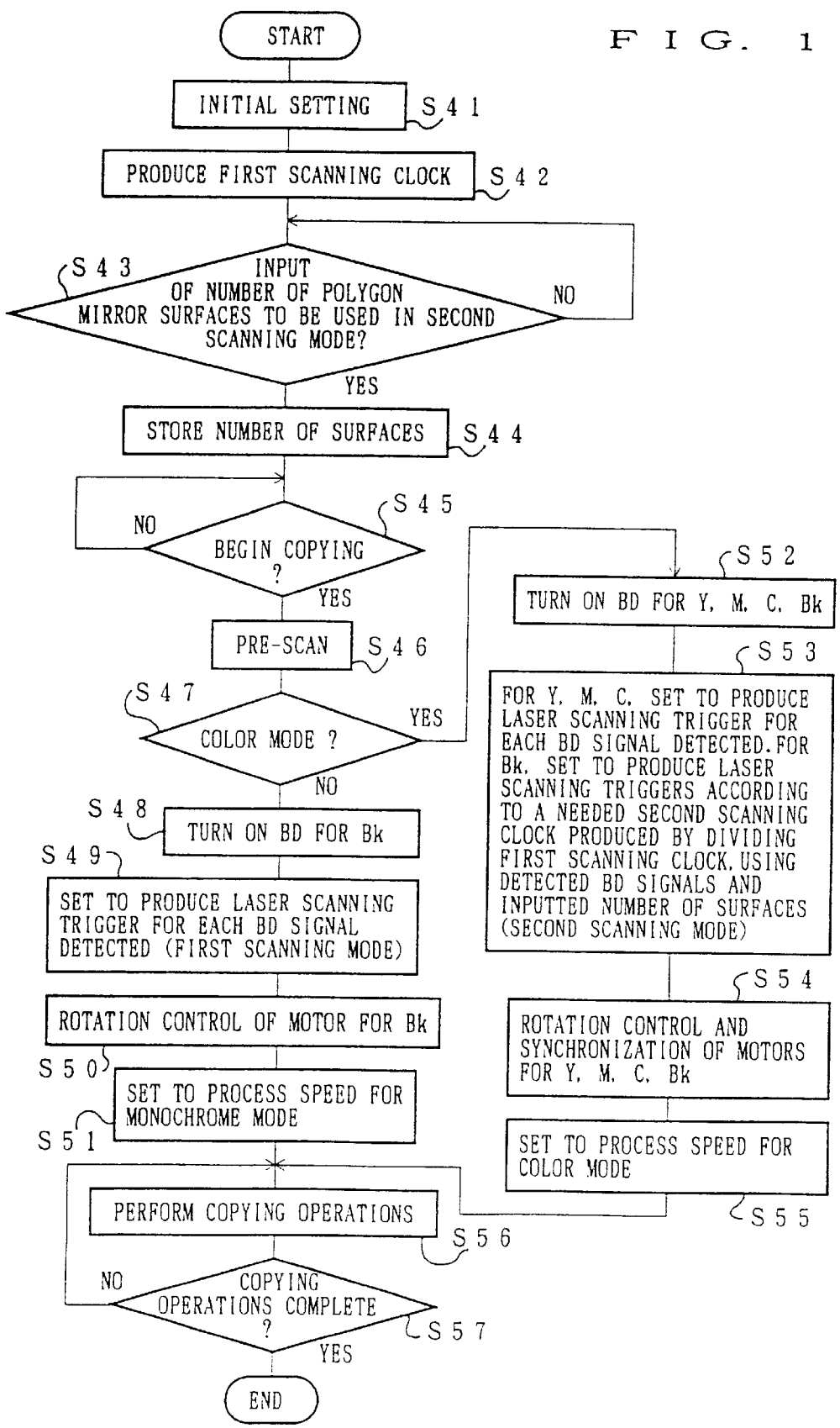
FIG. 15 is a flow-chart showing operation steps during copying in a color digital copy machine according to a third embodiment of the present invention.

The following will explain a further embodiment of the present invention with reference to FIGS. 8 and 15. Here, for ease of explanation, members having the same function as members of the first and second embodiments above will be given the same reference symbols, and explanation thereof will be omitted.

In the color digital copy machines in the first and second embodiments above, in the second scanning mode, laser scanning triggers were produced skipping certain BD signals according to a set number of mirror surfaces to be used, or according to a set BD signal pattern. However, in a color digital copy machine according to the present embodiment, a scanning clock for the first scanning mode, in which all of the mirror surfaces are used (first scanning clock) is produced, and, by dividing the first scanning clock, a scanning clock for the second scanning mode (second scanning clock) is produced, and laser scanning triggers are produced according to this scanning clock.

The flow-chart in FIG. 15 shows operating steps during copying in the color digital copy machine according to the present embodiment.

After performing, in S41, initial setting like that in S1 in the flow-chart in FIG. 1, in S42, the laser control unit 104 produces the first scanning clock. This is the scanning clock for performing laser scanning using all of the mirror surfaces of the polygon mirror 102Bk of the laser beam scanner unit 37Bk, and is produced on the basis of a base clock received from, for example, the oscillator 105, using the rotation speed and total number of surfaces of the polygon mirror 102Bk.

Then, in S53, for the laser beam scanner units 37Y, 37M, and 37C for yellow, magenta, and cyan, the laser control unit 104 is set so as to produce a laser scanning trigger each time a BD signal corresponding to a surface of the polygon mirror 102Y, 102M, or 102C is detected. For the laser beam scanner unit 37Bk for black, on the other hand, the laser control unit 104, using one of the detected BD signals, designates the beginning of the first scanning clock, and then produces the second scanning clock for the second scanning mode by dividing the first scanning clock by the number of polygon mirror surfaces to be used in the second scanning mode designated in S43 (or, of course, by a BD signal pattern, as explained in the second embodiment), and the laser control unit 104 is set so as to produce laser scanning triggers according to the second scanning clock. In this way, preparations for copying in the second scanning mode are made.

Except for S42 and S53 explained above, the operations in S41 through S57 of the flow-chart shown in FIG. 15 are equivalent to the operations in S1 through S16 (except for S12) of the flow-chart shown in FIG. 1, and accordingly explanation thereof will be omitted.

In the processing in S49 of the flow-chart in FIG. 15, for setting the timing of producing laser scanning triggers for performing copying in the first scanning mode, just as in the first and second embodiments above, a laser scanning trigger is produced each time a BD signal corresponding to a surface of the polygon mirror 102Y, 102M, or 102C is detected, but, alternatively, the beginning of the first scanning clock may be designated using one of the BD signals, and laser scanning triggers may be produced in synchronization with the first scanning clock.

The foregoing structure, in which a first scanning clock is produced, and a second scanning clock is produced by dividing the first scanning clock, is not influenced by uneven detection by the BDs 108, and, provided the operating state is normal, with few fine fluctuations, etc., scanning timing can be controlled more precisely than when skipping certain BD signals, as in the structures in the first and second embodiments above.

Fourth Embodiment

Figure 16:
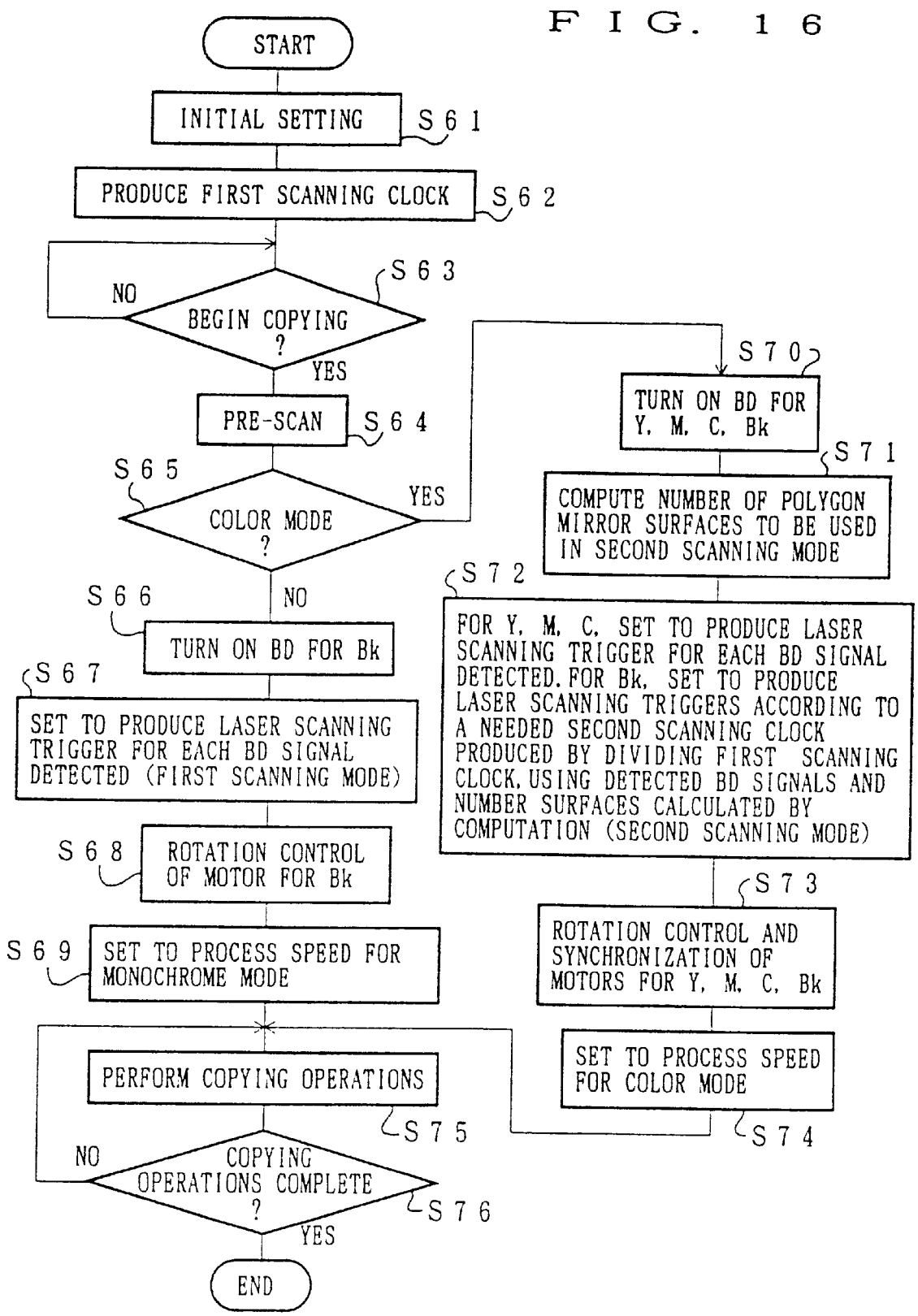
FIG. 16 is a flow-chart showing operation steps during copying in a color digital copy machine according to a fourth embodiment of the present invention.

The following will explain a further embodiment of the present invention with reference to FIG. 16. Here, for ease of explanation, members having the same function as members of the first, second, and third embodiments above will be given the same reference symbols, and explanation thereof will be omitted.

The distinctive feature of the color digital copy machine according to the present embodiment is that the number of surfaces of the polygon mirror 102Bk (the BD signal pattern) to be used in the second scanning mode is automatically computed from the difference in process speeds of the color and monochrome modes, and the second scanning clock is produced by dividing the first scanning clock using that number of surfaces (BD signal pattern).

The flow-chart in FIG. 16 shows operating steps during copying in the color digital copy machine according to the present embodiment.

In S62, as in S42 of the flow-chart shown in FIG. 15, the laser control unit 104 produces the first scanning clock. Then, if the color mode is determined in S65, operations proceed to S70, where each BD 108Y, 108M, 108C, and 108Bk is turned ON so as to detect BD signals, thereby informing the laser control unit 104 of the writing commencement position for each surface of the polygon mirrors 102Y, 102M, 102C, and 102Bk.

Then, in S71, the number of mirror surfaces to be used in the laser beam scanner unit 37Bk for black in the second scanning mode is computed using a ratio between the process speed s of the monochrome and color modes. Here, as in the first embodiment, the process speed of the monochrome mode is set to double that of the color mode, and each of the polygon mirrors 102Y, 102M, 102C, and 102Bk is hexagonal, and thus the number of surfaces to be used, computed by dividing the total number of mirror surfaces by the process speed ratio, is three.

In S72, as in S53 of the flow-chart shown in FIG. 15, for the laser beam scanner units 37Y, 37M, and 37C for yellow, magenta, and cyan, the laser control unit 104 is set so as to produce a laser scanning trigger each time a BD signal corresponding to a surface of the polygon mirror 102Y, 102M, or 102C, respectively, is detected. For the laser beam scanner unit 37Bk for black, on the other hand, the laser control unit 104, using one of the detected BD signals, designates the beginning of the first scanning clock, and then produces the second scanning clock for the second scanning mode by dividing the first scanning clock by the number of surfaces computed in S71 (or, of course, by a BD signal pattern, as explained in the second embodiment), and the laser control unit 104 is set so as to produce laser scanning triggers according to the second scanning clock. In this way, preparations for copying in the second scanning mode are made.

Except for S62, S71, and S72 explained above, the operations in S61 through S76 of the flow-chart shown in FIG. 16 are equivalent to the operations in S1 through S16 (except for S12) of the flow-chart shown in FIG. 1, and accordingly explanation thereof will be omitted.

Fifth Embodiment

The following will explain a further embodiment of the present invention with reference to FIGS. 5, 6, 17, and 18. Here, for ease of explanation, members having the same function as members of the foregoing embodiments will be given the same reference symbols, and explanation thereof will be omitted.

Figure 18:
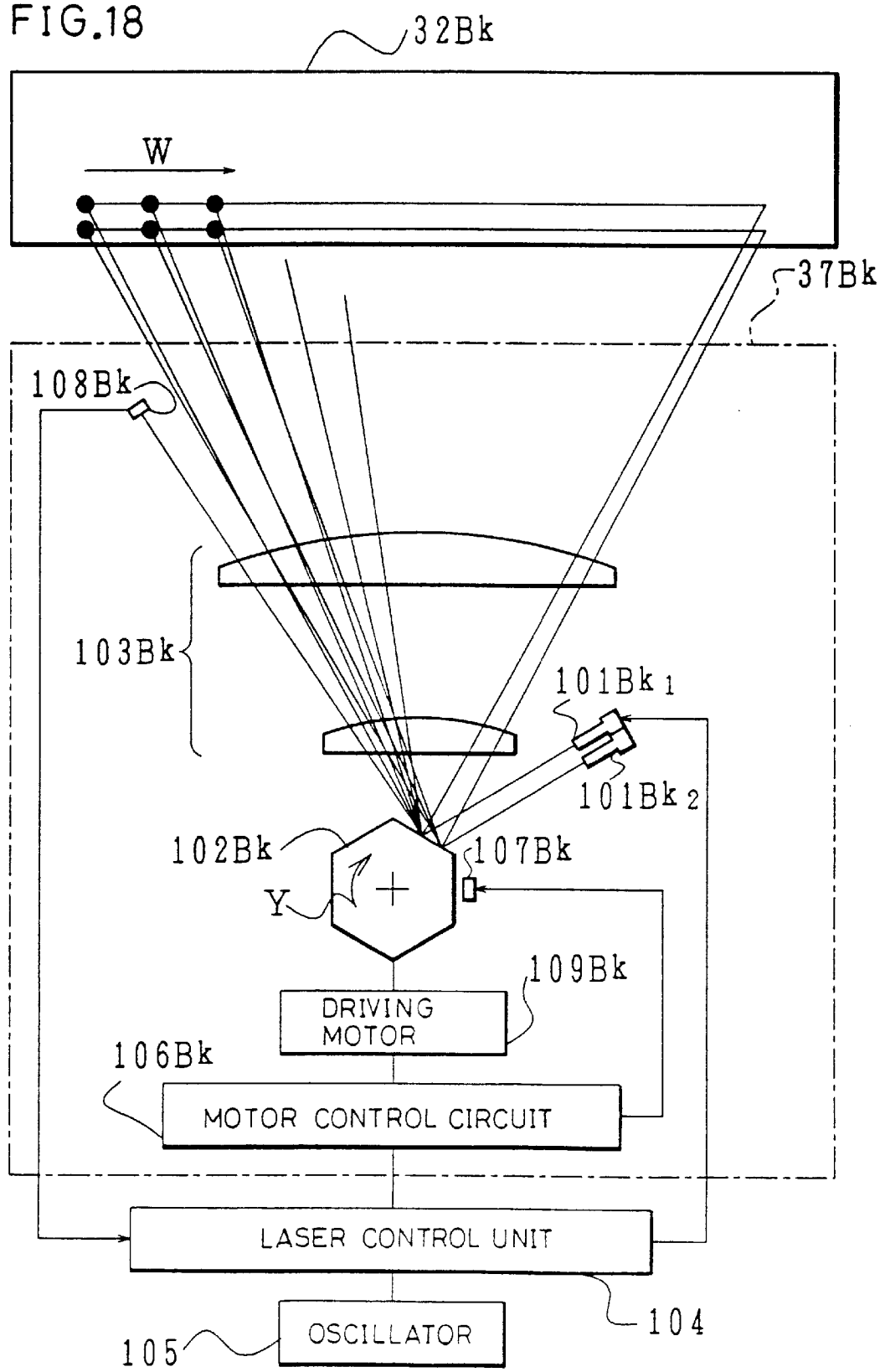
FIG. 18 is an explanatory drawing showing the structure of a laser beam scanner unit (for black) of the foregoing color digital copy machine.

In the color digital copy machine according to the present embodiment, each of the laser beam scanner units 37Y, 37M, and 37C for yellow, magenta, and cyan, respectively, is provided with a single laser projecting section 101Y, 101M, and 101C, respectively, as shown in FIG. 6, while the laser beam scanner unit 37Bk for black is provided with a plurality (two here) of laser projecting sections 101Bk$_1$ and 101Bk$_2$, as shown in FIG. 18. In monochrome mode, the laser beam scanner unit 37Bk for black scans two lines simultaneously using both laser projecting sections 101Bk$_1$ and 101Bk$_2$ (first scanning mode), and in color mode, scans one line at a time using only the laser projecting section 101Bk$_1$ (or the laser projecting section 101Bk$_2$), just as in the other laser beam scanner units 37Y, 37M, and 37C (second scanning mode), thus bringing the scanning density of the laser beam scanner unit 37Bk for black into conformity with that of the other laser beam scanner units 37Y, 37M, and 37C, without changing the rotation speed of the polygon mirror 102Bk.

In this case, the polygon mirror 102Bk for black can be driven at the same low speed as the polygon mirrors 102Y, 102M, and 102C for the other colors, and accordingly, problems such as delay of the first copy due to switching the speed of the polygon mirror 102Bk for black do not occur, and the operating efficiency of copying can be improved.

Figure 17:
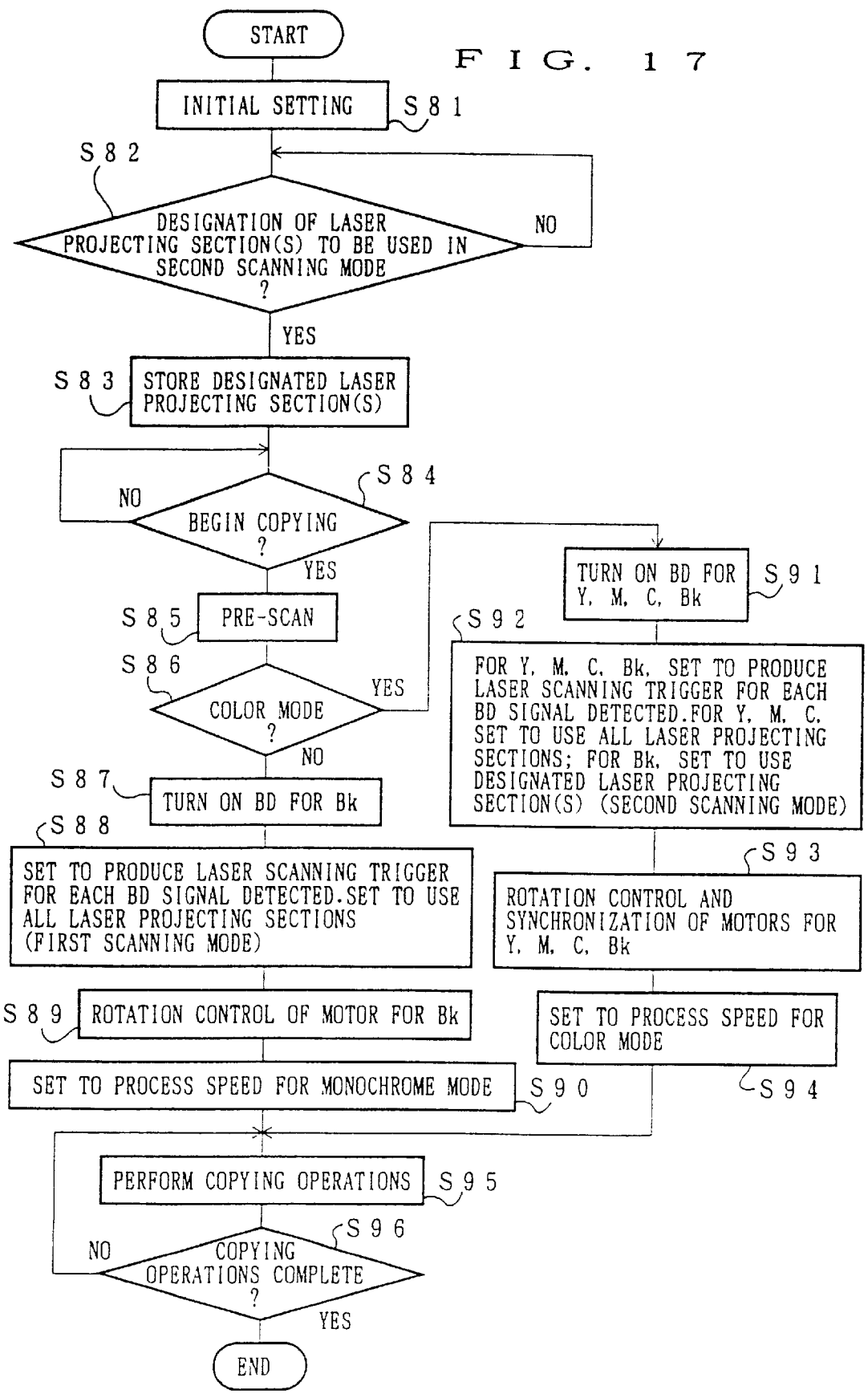
FIG. 17 is a flow-chart showing operation steps during copying in a color digital copy machine according to a fifth embodiment of the present invention.

The flow-chart in FIG. 17 shows operating steps during copying in the color digital copy machine according to the present embodiment.

First, in initial setting, the various loads necessary in copying operations are returned to initial positions or perform initial operations (S81).

Next, after the user designates which of the laser projecting sections 101Bk$_1$ or 101Bk$_2$ (discretionary) is to be used in the second scanning mode (S82), the designated laser projecting section 101Bk is stored in a predetermined memory area of the main memory 43b (S83). Designation of which laser projecting section 101Bk is performed by the user in a simulation mode entered by operating a specific key on the operating panel shown in FIG. 5. Here, assume that the user designates the laser projecting section 101Bk$_1$.

The number of laser projecting sections 101Bk which can be designated by the user here is determined by the number of laser projecting sections 101Y, 101M, and 101C used in the laser beam scanner units 37Y, 37M, and 37C for the other colors. Here, since each laser beam scanning unit uses one laser projecting section, the number of laser projecting sections 101Bk which can be designated is one.

After designation of the laser projecting section 101Bk to be used, operations wait until there is a command to begin copying (S84). Upon detection of the user's command for commencement of copying, image information of the original is read by conducting a pre-scan thereof (S85), and it is determined from the result of the pre-scan whether to use color or monochrome mode (S86).In other words, when the read original is a color original, color mode is determined, and when it is a monochrome original, monochrome mode is determined.

Here, when monochrome mode is determined, in order to inform the laser control unit 104 of the writing commencement position for each surface of the polygon mirror 102Bk, the BD 108Bk of the laser beam scanner unit 37Bk is turned ON (S87), and the laser control unit 104 is set so as to produce a laser scanning trigger each time a BD signal corresponding to a surface of the polygon mirror 102Bk is detected, and so as to use all of the laser projecting sections 101Bk (here, 101Bk$_1$ and 101Bk$_2$) (S88). In this way, the laser beam scanner unit 37Bk for black is prepared for copying operations in the first scanning mode, which uses all of the laser projecting sections 101Bk (101Bk$_1$ and 101Bk$_2$).

When preparations for copying operations in the first scanning mode are complete, the motor control circuit 106Bk performs rotation control of the driving motor 109Bk which rotates the polygon mirror 102Bk (S89), and sets the process speed to that for monochrome mode (S90).

Then copying operations are performed in the first scanning mode (S95), and when completion of copying operations is detected (S96), operations are ended.

When color mode is determined in S86, on the other hand, each BD 108Y, 108M, 108C, and 108Bk is turned ON so as to detect BD signals, thus informing the laser control unit 104 of the writing commencement position for each surface of the polygon mirrors 102Y, 102M, 102C, and 102Bk, (S91). Then, the laser control unit 104 is set as follows (S92).

Namely, for all of the laser beam scanner units 37Y, 37M, 37C, and 37Bk for yellow, magenta, cyan, and black, respectively, the laser control unit 104 is set so as to produce a laser scanning trigger each time a BD signal corresponding to a surface of the polygon mirror 102Y, 102M, 102C, or 102Bk is detected, and the laser beam scanner unit 37Bk for black is set so as to use only the laser projecting section(s) 101Bk designated by the user in S82 (here, the laser projecting section 101Bk$_1$).

In this way, preparations are made for copying operations in the second scanning mode, in which each of the laser beam scanner units 37Y, 37M, and 37C for yellow, magenta, and cyan, respectively, uses (of course) a single laser projecting section 101Y, 101M, and 101C, respectively, and the laser beam scanner unit 37Bk for black uses only the laser projecting section 101Bk$_1$ of the two laser projecting sections 101Bk$_1$ and 101Bk$_2$.

Then, the motor control circuits 106Y, 106M, 106C, and 106Bk perform rotation control and synchronization of the driving motors 109Y, 109M, 109C, and 109Bk, respectively, which rotate the polygon mirrors 102Y, 102M, 102C, and 102Bk, respectively (S93), and the process speed is set to that for color mode (S94).

Then copying operations are performed in the second scanning mode (S95), and when completion of copying operations is detected (S96), operations are ended.

Alternatively, if each of the laser beam scanner units 37Y, 37M, and 37C for the other colors is provided with, for example, two laser projecting sections 101Y, 101M, and 101C, respectively, and there are six laser projecting sections 101Bk, the scanning density for black can be brought into conformity with that for the other colors by using any two of the laser projecting sections 101Bk. However, in the same way as explained above with regard to the manner of skipping mirror surfaces of the polygon mirror 102Bk, if, of the six laser projecting sections 101Bk, two adjacent laser projecting sections 101Bk are used, although scanning density is the same on a macro level, there is a difference in scanning density on the micro level. Accordingly, it is preferable to skip an equal number of laser projecting sections 101Bk between each pair of used laser projecting sections 101Bk.

Incidentally, when the polygon mirror for black is driven at high speed, the scanning densities of the laser recording section for monochrome and the laser recording section(s) for color may also be equalized by using a combination of skipping laser light sources and skipping mirror surfaces.

Sixth Embodiment

Figure 19:
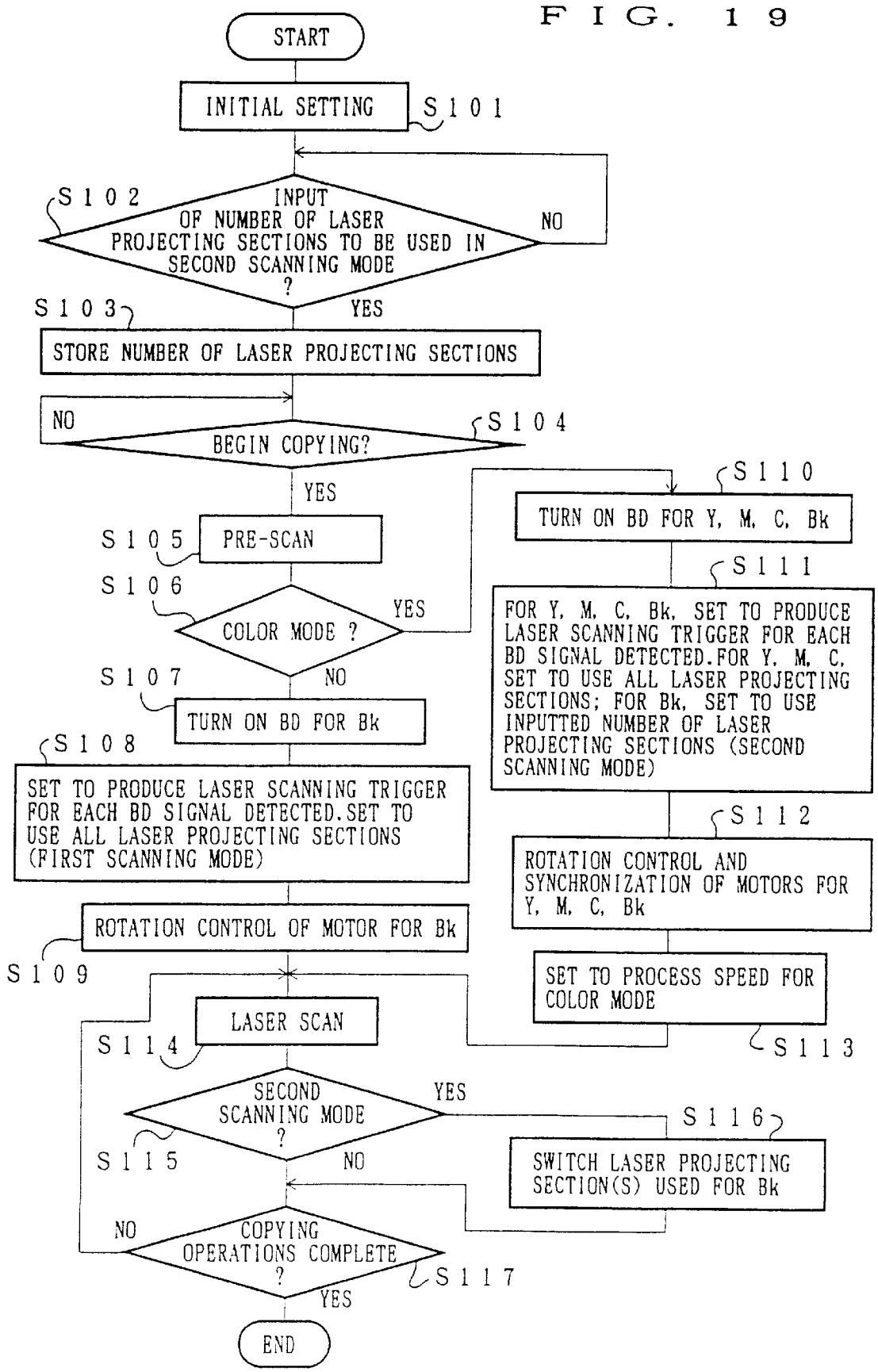
FIG. 19 is a flow-chart showing operation steps during copying in a color digital copy machine according to a sixth embodiment of the present invention.

The following will explain a further embodiment of the present invention with reference to FIG. 19. Here, for ease of explanation, members having the same function as members of the first and fifth embodiments above will be given the same reference symbols, and explanation thereof will be omitted.

In the color digital copy machine according to the fifth embodiment above, in the second scanning mode, of the total laser projecting sections 101Bk (101Bk$_1$ and 101Bk$_2$), only a designated laser projecting section 101Bk (in the fifth embodiment, 101Bk$_1$) is used. However, using only the laser projecting section 101Bk$_1$ in the second scanning mode leads to the problem that its life is shortened in comparison with the laser projecting section 101Bk$_2$, and thus it is preferable to use the two laser projecting sections 101Bk with equal frequency.

For this reason, the color digital copy machine according to the present embodiment has a structure in which the user inputs only the number of laser projecting sections 101Bk to be used, and the laser projecting sections 101Bk used are sequentially switched for each laser scan.

The flow-chart in FIG. 19 shows operating steps during copying in the color digital copy machine according to the present embodiment.

First, as in S81 of the flow-chart shown in FIG. 17, initial settings are made (S101), and next, after the user inputs the number (discretionary) of laser projecting sections 101Bk to be used in the second scanning mode (S102), the inputted number of laser projecting sections 101Bk is stored in a predetermined memory area of the main memory 43b (S103). Inputting of the number of laser projecting sections 101Bk is performed by the user in a simulation mode entered by operating a specific key on the operating panel shown in FIG. 5.

As explained in the fifth embodiment above, the number of laser projecting sections 101Bk which can be inputted by the user here is determined by the number of laser projecting sections 101Y, 101M, and 101C used in the laser beam scanner units 37Y, 37M, and 37C for the other colors, and, in the present embodiment, is one.

Then, in S111, for all of the laser beam scanner units 37Y, 37M, 37C, and 37Bk for yellow, magenta, cyan, and black, respectively, the laser control unit 104 is set so as to produce a laser scanning trigger each time a BD signal corresponding to a surface of the polygon mirror 102Y, 102M, 102C, or 102Bk is detected, and the laser beam scanner unit 37Bk for black is set so as to use only the number of laser projecting sections 101Bk inputted by the user in S102 (here, one laser projecting section, 101Bk$_1$).

Then, in copying operations in S114, in the second scanning mode, the laser projecting section(s) 101Bk used are switched for each laser scan (S115, S116).

Except for S111, S114, S115, and S116 explained above, the operations in S104 through S117 of the flow-chart shown in FIG. 19 are equivalent to the operations in S84 through S96 (except for S92 and S95) of the flow-chart shown in FIG. 17, and accordingly explanation thereof will be omitted.

Further, in the present embodiment, the laser projecting section(s) 101Bk used are sequentially switched for each laser scan during copying operations, but they may also be switched for each sheet of paper P.

Seventh Embodiment

Figure 20:
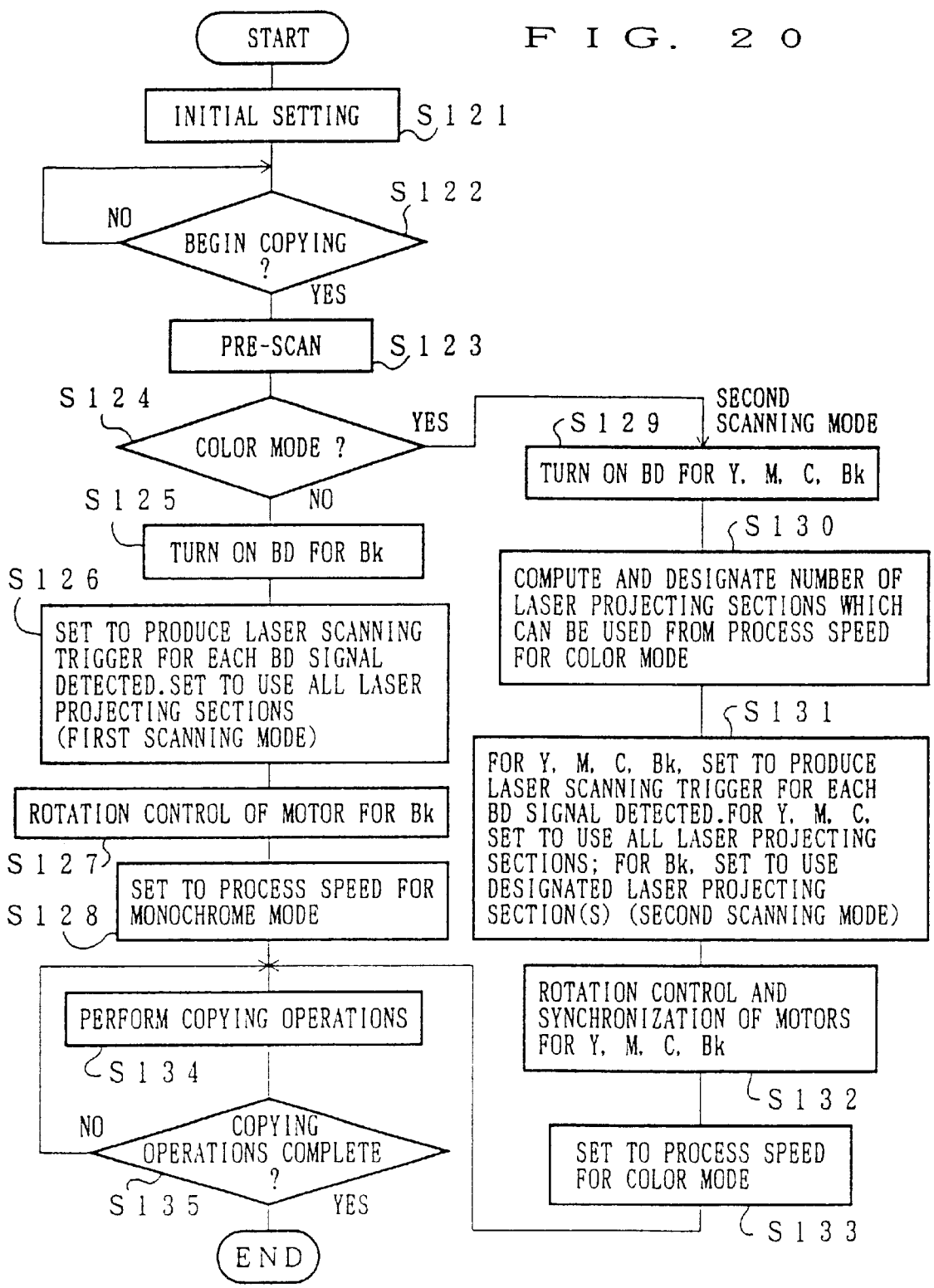
FIG. 20 is a flow-chart showing operation steps during copying in a color digital copy machine according to a seventh embodiment of the present invention.

The following will explain a further embodiment of the present invention with reference to FIG. 20. Here, for ease of explanation, members having the same function as members of the first and fifth embodiments above will be given the same reference symbols, and explanation thereof will be omitted.

The distinctive feature of the color digital copy machine according to the present embodiment is that the number of laser projecting sections 101Bk to be used in the second scanning mode is automatically computed and designated from the process speed of color mode.

The flow-chart in FIG. 20 shows operating steps during copying in the color digital copy machine according to the present embodiment.

In the present embodiment, after making initial settings in S121 as in S81 of the flow-chart shown in FIG. 17, operations wait until there is a command to begin copying (S122), and when a command to commence copying is detected, pre-scan is performed (S123), and if, based on the results thereof, color mode is determined (S124), operations proceed to S129, where each BD 108Y, 108M, 108C, and 108Bk is turned ON so as to detect BD signals, thus informing the laser control unit 104 of the writing commencement position for each surface of the polygon mirrors 102Y, 102M, 102C, and 102Bk.

Then, in S130, the number of laser projecting sections 101Bk to be used in the laser beam scanner unit 37Bk for black in the second scanning mode is computed from the process speed of color mode. Here, the number of laser projecting sections 101Bk to be used is computed as one, as in the other laser beam scanner units 37Y, 37M, and 37C, and thus only the laser projecting section 101Bk$_1$ is designated for use.

In S131, for all of the laser beam scanner units 37Y, 37M, 37C, and 37Bk for yellow, magenta, cyan, and black, respectively, the laser control unit 104 is set so as to produce a laser scanning trigger each time a BD signal corresponding to a surface of the polygon mirror 102Y, 102M, 102C, or 102Bk is detected, and the laser beam scanner unit 37Bk for black is set so as to use only the number of laser projecting sections 101Bk computed and designated in S130 (here, only the laser projecting section 101Bk$_1$).

In this way, preparations are made for copying operations in the second scanning mode, in which each of the laser beam scanner units 37Y, 37M, and 37C for yellow, magenta, and cyan, respectively, uses (of course) a single laser projecting section 101Y, 101M, and 101C, respectively, and the laser beam scanner unit 37Bk for black uses only the laser projecting section 101Bk$_1$ of the two laser projecting sections 101Bk$_1$ and 101Bk$_2$.

Except for S130 explained above, the operations in S122 through S135 of the flow-chart shown in FIG. 20 are equivalent to the operations in S84 through S96 of the flow-chart shown in FIG. 17, and accordingly explanation thereof will be omitted.

In the foregoing laser recording section for monochrome image formation, the first and second scanning modes can be realized without changing rotation speed of the polygon mirror by, for example, performing laser scanning using all of the surfaces of the polygon mirror in the first scanning mode, and performing laser scanning skipping certain surfaces of the polygon mirror in the second scanning mode.

Further, in the second scanning mode, when certain mirror surfaces of the polygon mirror are to be skipped, it is preferable to skip surfaces such that a plurality of surfaces are used. This is because in a structure in which, for example, one predetermined surface among the plurality of surfaces is used, uneven deflection of that surface markedly appears in the copy image, and image distortion arises due to the uneven deflection in the primary scanning direction. By using a plurality of surfaces, a good image free of uneven deflection in the primary scanning direction can be obtained.

Further, in the second scanning mode, when certain mirror surfaces of the polygon mirror are to be skipped, it is preferable to skip surfaces such that the intervals between the surfaces used are uniform. This is because, when using, for example, three surfaces of a hexagonal polygon mirror, a case of use of three adjacent surfaces and a case of use of every other surface have the same scanning densities on the macro level, but on the micro level, the respective scanning densities are different, which leads to unevenness. With uniform intervals between the surfaces used, a state can be achieved in which there is no difference in scanning density even on the micro level, thus contributing to improvement of image quality.

Further, when preparing data from one surface of the polygon mirror, a certain amount of time is necessary. In view of this fact, if surfaces are skipped as above, the surfaces used are not adjacent, and thus sufficient time can be devoted to data processing. As a result, this has the advantages of reducing the cost of the image processing substrate, and making it comparatively easier to control the timing of control operations.

Further, when skipping mirror surfaces such that the interval between the surfaces used is fixed, it is preferable to control laser scanning in the second scanning mode by providing a sensor in a position prior to a writing commencement position of the laser light, which senses the laser light and outputs signals corresponding to each surface of the polygon mirror, and by dividing these signals in accordance with the surfaces to be used.

The signals outputted by the sensor directly contain the driving state of the motor which rotates the polygon mirror, and thus scanning timing can be precisely controlled in response to misalignment of timing due to fine fluctuations, etc.

Further, when skipping mirror surfaces such that the interval between the surfaces used is fixed, it is preferable to divide, in accordance with the surfaces to be used, a first laser scanning clock, which controls laser scanning in the first scanning mode, thereby producing a second laser scanning clock, and use the second laser scanning clock to control laser scanning in the second scanning mode.

When, for example, laser scanning in the second scanning mode is controlled by providing, in a position prior to a writing commencement position of the laser light, the foregoing sensor, which senses the laser light and outputs signals corresponding to each surface of the polygon mirror, and by dividing these signals in accordance with the surfaces to be used, unevenness among sensors must be taken into account, but here, since the second scanning clock is produced on the basis of a first scanning clock produced by dividing, for example, a base clock, unevenness among sensors need not be taken into account. For this reason, provided the operating state is normal, with few fine fluctuations, etc., scanning timing can be controlled more precisely in the present structure.

Further, in the foregoing laser recording section for monochrome image formation, the first and second scanning modes can be realized without changing rotation speed of the polygon mirror by, for example, providing the laser recording section for monochrome image formation with more laser light sources than each laser recording section for color image formation is provided with, and performing laser scanning using all of the laser light sources in the first scanning mode, and skipping certain laser light sources in the second scanning mode.

Further, in an image-forming device according to the present invention, when certain of the laser light sources are to be skipped in the second scanning mode, it is preferable to switch the laser light source(s) used such that each laser light source is used once every predetermined cycle. This is because if, for example, a certain laser light source among the plurality of laser light sources is always used, its life will be shortened in comparison with the others. By using each laser light source once every predetermined cycle, the lives of the plurality of laser light sources can be equalized.

Further, in an image-forming device according to the present invention, when certain of the laser light sources are to be skipped in the second scanning mode, it is preferable to skip laser light sources such that the intervals between the laser light sources used are uniform. This is because, when using, for example, three out of six laser light sources, a case of use of three adjacent laser light sources and a case of use of every other laser light source have the same scanning densities on the macro level, but on the micro level, the respective scanning densities are different, which leads to unevenness. With uniform intervals between the laser light sources used, a state can be achieved in which there is no difference in scanning density even on the micro level, thus contributing to improvement of image quality.

Further, in an image-forming device according to the present invention, when forming monochrome images, laser light sources in the laser recording section for monochrome image formation may be skipped, using a number of laser light sources differing from the numbers used in the foregoing first and second scanning modes. With this structure, a scanning density different from those of the foregoing modes can be easily realized without changing rotation speed of the polygon mirror.

In the image-forming device according to the present invention, the image-forming section may be given a structure having a plurality of photoreceptors, one for each color. Unlike a multiple revolution process color image-forming device provided with only one photoreceptor, a color image-forming device with a tandem structure, i.e., one with a photoreceptor for each color, in order to create a difference in copying speed between monochrome and color modes, requires a method of increasing process speed and setting a faster scanning speed (writing speed) of each laser recording section. For this reason, by adopting the structure of the present invention, switching from monochrome to color mode, especially, can be performed instantaneously, which is effective in improving the operating efficiency of copying.

Each of the foregoing embodiments discussed examples of color digital copy machines which used a polygon mirror as a rotating polygon for reflecting laser light, but the present invention may be applied to any color digital copy machine which uses a rotating polygon having a plurality of reflective surfaces.

Further, each of the foregoing embodiments discussed examples which, when bringing the respective scanning densities of the laser recording sections for monochrome image formation and color image formation into conformity without changing rotation speed of the polygon mirrors, made use of either a method of skipping certain surfaces of the polygon mirror of the laser recording section for monochrome image formation or a method of skipping certain laser light sources of the laser recording section for monochrome image formation, but equivalent effects may be obtained by using a combination of both methods, or by switching between the two methods as necessary.

Further, each of the foregoing embodiments discussed examples of color digital copy machines of the tandem type, but in a multiple revolution process color digital copy machine provided with a single photoreceptor drum, as well, increasing process speed and scanning speed of the laser beam scanner unit for black during monochrome mode can realize a structure in which monochrome copying speed is even faster than the conventional monochrome copying speed of four times that of color copying, and accordingly, the present invention may also be applied to this kind of structure.

Further, in each of the foregoing embodiments, the second scanning mode was always set, but since color copying is possible using the toners of the three colors yellow, magenta, and cyan, without using the black toner, a mode may also be provided in which, when, for example, the black toner has run out, color copying is performed using the toners of the three colors yellow, magenta, and cyan. In this way, even if the black toner runs out, the copy machine can continue to be used, thus improving operation rate thereof.

The embodiments and concrete examples of implementation discussed in the foregoing detailed explanation of the present invention serve solely to illustrate the technical contents of the present invention, which should not be narrowly interpreted within the limits of such concrete examples, but rather may be applied in many variations without departing from the spirit of the present invention and the scope of the patent claims set forth below.

What is claimed is:

1. A color image-forming device comprising:

an image-forming section, provided with a recording section for color image formation and a recording section for monochrome image formation, each of which performs optical scanning of a photoreceptor by using a rotating polygon having a reflective mirror on at least one surface thereof to guide to said photoreceptor light modulated in accordance with image information; said image-forming section forming an electrostatic latent image on said photoreceptor by light scanning, the electrostatic image corresponding to said image information, and forming an image from the electrostatic image; and process speed switching means, which switches a process speed of said image-forming section such that said process speed is faster during monochrome image formation than during color image formation;

said recording section for monochrome image formation being provided with a first scanning mode, which corresponds to a high process speed, and a second scanning mode, which corresponds to a low process speed, and which performs scanning with a scanning density equivalent to that of the said recording section for color image formation, without changing rotation speed of said rotating polygon having a reflective mirror on at least one surface thereof.

2. The color image-forming device set forth in claim 1, further comprising:

control means, which produces control signals for driving a light source which projects the light, such that the respective scanning densities of said recording section for monochrome image formation and said recording section for color image formation are equal.

3. The color image-forming device set forth in claim 2, wherein:

said rotating polygon has reflective mirrors on a plurality of surfaces thereof; and the control signals produced by said control means in the second scanning mode are signals which, by skipping certain reflective mirror surfaces of said rotating polygon, use a number of reflective mirror surfaces thereof which is smaller than a number of reflective mirror surfaces thereof used in the first scanning mode.

4. The color image-forming device set forth in claim 3, wherein:

the control signals produced by said control means in the first scanning mode are signals which perform optical scanning using all of the reflective mirror surfaces of said rotating polygon.

5. The color image-forming device set forth in claim 3, wherein:

when skipping certain reflective mirror surfaces of said rotating polygon in the second scanning mode, the control signals produced by said control means are signals which skip reflective mirror surfaces such that intervals between reflective mirror surfaces used are uniform.

6. The color image forming device set forth in claim 3, further comprising a sensor which senses light, provided adjacent to said photoreceptor in a position, with respect to a scanning direction of the light, prior to a writing commencement position of the light, wherein:

when skipping certain reflective mirror surfaces of said rotating polygon in the second scanning mode, said control means divides an output from said sensor, corresponding to each reflective mirror surface of said rotating polygon, by a number of reflective mirror surfaces to be used, and produces the control signals upon detection of a division result.

7. The color image-forming device set forth in claim 3, wherein:

when skipping certain reflective mirror surfaces of said rotating polygon in the second scanning mode, the control signals produced by said control means include a second clock prepared by said control means by dividing a first clock, for control of optical scanning in the first scanning mode, according to a number of reflective mirror surfaces to be used.

8. The color image-forming device set forth in claim 3, wherein:

in the second scanning mode, the control signals produced by said control means are signals for performing optical scanning using a plurality of the reflective mirror surfaces of said polygon mirror.

9. The color image-forming device set forth in claim 3, wherein:

said recording section for monochrome image formation includes a greater number of light sources than does each said recording section for color image formation; and the control signals produced by said control means in the second scanning mode are signals which, by skipping certain light sources, use a number of light sources which is smaller than a number of light sources used in the first scanning mode.

10. The color image-forming device set forth in claim 9, wherein:

the control signals produced by said control means in the first scanning mode are signals which perform optical scanning using all of the light sources.

11. The color image-forming device set forth in claim 9, wherein:

when skipping certain light sources in the second scanning mode, the control signals produced by said control means are signals which switch the light source(s) used such that each light source is used once every predetermined cycle.

12. The color image-forming device set forth in claim 9, wherein:

when skipping certain light sources in the second scanning mode, the control signals produced by said control means are signals which skip light sources such that intervals between light sources used simultaneously are uniform.

13. The color image-forming device set forth in claim 9, further comprising:

an operating section for inputting at least one of: light source(s) to be used, a number of light sources to be used, and a number of reflective mirror surfaces of said rotating polygon to be used, when skipping light sources or reflective mirror surfaces in the second scanning mode.

14. The color image-forming device set forth in claim 9, further comprising:

a sensor which senses light, provided adjacent to said photoreceptor in a position, with respect to a scanning direction of the light, prior to a writing commencement position of the light; and an operating section for inputting a ratio for skipping outputs from said sensor, which correspond to reflective mirror surfaces of said rotating polygon, when skipping certain outputs in the second scanning mode.

15. The color image-forming device set forth in claim 3, further comprising:

an operating section for inputting a number of reflective mirror surfaces of said rotating polygon to be used when skipping reflective mirror surfaces in the second scanning mode.

16. The color image-forming device set forth in claim 3, further comprising:

a sensor which senses light, provided adjacent to said photoreceptor in a position, with respect to a scanning direction of the light, prior to a writing commencement position of the light; and an operating section for inputting a ratio for skipping outputs from said sensor, which correspond to reflective mirror surfaces of said rotating polygon, when skipping certain outputs in the second scanning mode.

17. The color image-forming device set forth in claim 2, wherein:

said recording section for monochrome image formation includes a greater number of light sources than does each said recording section for color image formation; and the control signals produced by said control means in the second scanning mode are signals which, by skipping certain light sources, use a number of light sources which is smaller than a number of light sources used in the first scanning mode.

18. The color image-forming device set forth in claim 17, wherein:

the control signals produced by said control means in the first scanning mode are signals which perform optical scanning using all of the light sources.

19. The color image-forming device set forth in claim 17, wherein:

when skipping certain light sources in the second scanning mode, the control signals produced by said control means are signals which switch the light source(s) used such that each light source is used once every predetermined cycle.

20. The color image-forming device set forth in claim 17, wherein:

when skipping certain light sources in the second scanning mode, the control signals produced by said control means are signals which skip light sources such that intervals between light sources used simultaneously are uniform.

21. The color image-forming device set forth in claim 17, further comprising:

an operating section for inputting light source(s) to be used when skipping light sources in the second scanning mode.

22. The color image-forming device set forth in claim 17, further comprising:

an operating section for inputting a number of light sources to be used when skipping light sources in the second scanning mode.

23. The color image-forming device set forth in claim 17, further comprising:

a sensor which senses light, provided adjacent to said photoreceptor in a position, with respect to a scanning direction of the light, prior to a writing commencement position of the light; and an operating section for inputting a ratio for skipping outputs from said sensor, which correspond to reflective mirror surfaces of said rotating polygon, when skipping certain outputs in the second scanning mode.

24. The color image-forming device set forth in claim 1, including a plurality of photoreceptors, one for each color.

25. The color image-forming device set forth a claim 1, wherein:

said rotating polygon is a polygon mirror.

26. The color image-forming device set forth in claim 25, wherein:

said polygon mirror has from four to eight surfaces, inclusive.

27. The color image-forming device set forth in claim 1 wherein:

said process speed is a surface speed of said photoreceptor.

28. The color image-forming device set forth in claim 1 wherein:

said process speed is a transport speed of said photoreceptor.

29. A method of forming images by using a rotating polygon having a reflective mirror on at least one surface thereof to optically scan a photoreceptor, wherein:

when forming images at a first process speed or at a second process speed slower than said first process speed, said rotating polygon is rotated at a fixed speed;

a plurality of light sources and/or a plurality of reflective surfaces of said rotating polygon is provided; and by selecting said plurality of light sources and/or said plurality of reflective surfaces, and skipping certain of said plurality of light sources and/or said plurality of reflective surfaces, scanning density of said photoreceptor is fixed in a laser beam scanner unit for black and in laser beam scanner unit(s) for color(s), regardless of process speed.

* * * * *